United States Patent
Kusahara et al.

(10) Patent No.: US 10,828,827 B2
(45) Date of Patent: *Nov. 10, 2020

(54) POWDER MATERIAL FOR THREE-DIMENSIONAL OBJECT FORMATION, HARDENING LIQUID AND THREE-DIMENSIONAL OBJECT FORMATION KIT, AND FORMATION METHOD AND FORMATION APPARATUS OF THREE-DIMENSIONAL OBJECT

(71) Applicant: RICOH COMPANY, LTD., Tokyo (JP)

(72) Inventors: Teruki Kusahara, Shizuoka (JP); Masaki Watanabe, Shizuoka (JP); Keiko Osaka, Kanagawa (JP); Mitsuru Naruse, Shizuoka (JP); Mariko Kojima, Tokyo (JP); Yasuyuki Yamashita, Shizuoka (JP); Yoshihiro Norikane, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 387 days.

This patent is subject to a terminal disclaimer.

(21) Appl. No.: 15/022,054

(22) PCT Filed: Sep. 29, 2014

(86) PCT No.: PCT/JP2014/076638
§ 371 (c)(1),
(2) Date: Mar. 15, 2016

(87) PCT Pub. No.: WO2015/046629
PCT Pub. Date: Apr. 2, 2015

(65) Prior Publication Data
US 2016/0236412 A1    Aug. 18, 2016

(30) Foreign Application Priority Data

Sep. 30, 2013   (JP) ................... 2013-203844
Jul. 24, 2014   (JP) ................... 2014-151022

(51) Int. Cl.
*B29C 64/153*    (2017.01)
*B29C 64/165*    (2017.01)
(Continued)

(52) U.S. Cl.
CPC .......... *B29C 64/153* (2017.08); *B22F 1/0062* (2013.01); *B22F 1/0074* (2013.01);
(Continued)

(58) Field of Classification Search
CPC ..... B29C 64/153; B29C 64/165; B33Y 10/00; B28B 1/001; B28B 7/465
See application file for complete search history.

(56) References Cited

U.S. PATENT DOCUMENTS 4,460,751 A * 7/1984 Hanlon .................... C09K 3/00
                                                                         166/270
5,204,055 A    4/1993 Sachs et al.
(Continued)

FOREIGN PATENT DOCUMENTS

EP    1 415 792 A2    5/2004
GB       559689 A * 3/1944 ............. G03C 5/268
(Continued)

OTHER PUBLICATIONS

English language machine translation of JP 2003-252916 (Sep. 2003).*

(Continued)

*Primary Examiner* — Christopher D Rodee
(74) *Attorney, Agent, or Firm* — Oblon, McClelland, Maier & Neustadt, L.L.P.

(57) ABSTRACT

Provided is a three-dimensional object formation method for forming a three-dimensional object by at least repeating: forming a powder material layer using a powder material for three-dimensional object formation containing a base material coated with an organic material; and hardening a pre- (Continued)

determined region of the powder material layer by delivering a hardening liquid to the powder material layer formed in the formation of a powder material layer, where the hardening liquid contains a cross-linking agent cross-linkable with the organic material.

14 Claims, 2 Drawing Sheets

(51) Int. Cl.
| | |
|---|---|
| B33Y 70/00 | (2020.01) |
| B33Y 10/00 | (2015.01) |
| B33Y 30/00 | (2015.01) |
| B28B 1/00 | (2006.01) |
| B28B 7/46 | (2006.01) |
| B22F 1/00 | (2006.01) |
| C04B 20/10 | (2006.01) |
| B22F 3/00 | (2006.01) |
| C04B 26/04 | (2006.01) |
| B22F 3/105 | (2006.01) |
| C04B 111/00 | (2006.01) |
| B29K 29/00 | (2006.01) |
| B29K 105/00 | (2006.01) |

(52) U.S. Cl.
CPC ............ *B22F 3/008* (2013.01); *B22F 3/1055* (2013.01); *B28B 1/001* (2013.01); *B28B 7/465* (2013.01); *B29C 64/165* (2017.08); *B33Y 10/00* (2014.12); *B33Y 30/00* (2014.12); *B33Y 70/00* (2014.12); *C04B 20/1033* (2013.01); *C04B 26/04* (2013.01); *B29K 2029/04* (2013.01); *B29K 2105/251* (2013.01); *C04B 2111/00181* (2013.01)

(56) References Cited

U.S. PATENT DOCUMENTS

| | | | |
|---|---|---|---|
| 5,749,041 A | 5/1998 | Lakshminarayan et al. | |
| 5,907,011 A * | 5/1999 | Jakob | C08J 3/005 524/524 |
| 6,403,002 B1 | 6/2002 | Van Der Geest | |
| 7,049,363 B2 | 5/2006 | Shen | |
| 8,668,852 B2 * | 3/2014 | Ookubo | C08J 3/122 264/113 |
| 2001/0050448 A1 | 12/2001 | Kubo et al. | |
| 2004/0036200 A1 | 2/2004 | Patel et al. | |
| 2004/0038009 A1 * | 2/2004 | Leyden | B29C 64/165 428/195.1 |
| 2004/0152602 A1 * | 8/2004 | Boles | C09K 8/74 507/100 |
| 2004/0161544 A1 | 8/2004 | Kasperchik | |
| 2004/0173946 A1 | 9/2004 | Pfeifer et al. | |
| 2005/0003189 A1 | 1/2005 | Bredt et al. | |
| 2006/0011103 A1 | 1/2006 | Zhong | |
| 2006/0165546 A1 | 7/2006 | Yamada et al. | |
| 2006/0251535 A1 | 11/2006 | Pfeifer et al. | |
| 2006/0251826 A1 * | 11/2006 | Pfeifer | B01J 2/006 427/558 |
| 2008/0241404 A1 | 10/2008 | Allaman et al. | |
| 2008/0283155 A1 | 11/2008 | Yakovleva et al. | |
| 2009/0298033 A1 * | 12/2009 | Suzuki | B28B 1/001 434/263 |
| 2012/0033002 A1 | 2/2012 | Seeler et al. | |
| 2014/0121099 A1 | 5/2014 | Taoka et al. | |
| 2014/0309343 A1 * | 10/2014 | Venema | B01J 2/00 524/71 |
| 2016/0271695 A1 * | 9/2016 | Osaka | B22F 3/1055 |
| 2017/0209927 A1 * | 7/2017 | Yamashita | B29C 64/165 |

FOREIGN PATENT DOCUMENTS

| | | |
|---|---|---|
| JP | 06-218712 | 8/1994 |
| JP | 11-513746 | 11/1999 |
| JP | 2000-212502 | 8/2000 |
| JP | 2000-328106 | 11/2000 |
| JP | 2001-334581 A | 12/2001 |
| JP | 2002-014493 | 1/2002 |
| JP | 2003-048253 | 2/2003 |
| JP | 2003252916 A * | 9/2003 |
| JP | 2004-522622 | 7/2004 |
| JP | 2004-330743 | 11/2004 |
| JP | 2005-144870 | 6/2005 |
| JP | 2005-297325 | 10/2005 |
| JP | 2006-515812 | 6/2006 |
| JP | 2006-200030 | 8/2006 |
| JP | 2006-521264 | 9/2006 |
| JP | 2007-502713 | 2/2007 |
| JP | 2007-291211 | 11/2007 |
| JP | 2008-050577 | 3/2008 |
| JP | 2009-508723 | 3/2009 |
| JP | 4553989 | 7/2010 |
| JP | 2012-521647 | 9/2012 |
| RU | 2 299 787 C2 | 5/2007 |
| WO | WO 02/064354 A1 | 8/2002 |
| WO | WO 2007/039450 A1 | 4/2007 |
| WO | WO2007/122804 A1 | 11/2007 |
| WO | WO2012/173127 A1 | 12/2012 |

OTHER PUBLICATIONS

Extended European Search Report dated Sep. 8, 2016 in European Patent Application No. 14848782.0.
Combined Office Action and Search Report dated Aug. 4, 2017 in Russian Patent Application No. 2016116942 with partial English translation and English translation categories of cited Documents.
International Search Report dated Jan. 6, 2015 for counterpart International Patent Application No. PCT/JP2014/076638 filed Sep. 29, 2014.
European Office Action dated Apr. 11, 2019 in European Patent Application No. 14848782.0, 8 pages.
Notification of Reexamination dated Aug. 8, 2019, in Chinese Patent Application No. 201480053843.6 (w/ English translation).
Yungan Wang et al., "3D Printing", Huazhong University of Science & Technology Press, Jul. 2013, pp. 42-44.
Xianchun Yu et. al., "Wood Adhesives and Gluing Technology", Mar. 2011, p. 106.
Official Communication dated Oct. 4, 2019, in European Patent Application No. 14 848 782.0.

* cited by examiner

POWDER MATERIAL FOR THREE-DIMENSIONAL OBJECT FORMATION, HARDENING LIQUID AND THREE-DIMENSIONAL OBJECT FORMATION KIT, AND FORMATION METHOD AND FORMATION APPARATUS OF THREE-DIMENSIONAL OBJECT

TECHNICAL FIELD

The present invention relates to a powder material for three-dimensional object formation, a hardening liquid, and a three-dimensional object formation kit, and a formation method and a formation apparatus of a three-dimensional object, which enable easy and efficient formation of a complex three-dimensional object.

BACKGROUND ART

Recently, there have been increasing needs for small-lot production of complex minute three-dimensional objects. A powder sintering method, a powder binding method, etc. have been proposed as techniques for catering to the needs (see PTL 1 to PTL 3).

The powder sintering method is a method of forming a powder thin layer, irradiating the thin layer with laser light to form a thin sintered product, repeating these steps to stack thin sintered products sequentially over the thin sintered product to thereby obtain a desired three-dimensional object. The powder binding method is a method of hardening a powder thin layer using an adhesive material instead of performing laser sintering as in the powder sintering method, and stacking such thin layers to thereby obtain a desired three-dimensional object.

As the powder binding method, for example, there are proposed a method of supplying an adhesive material to a powder thin layer according to an inkjet method, a method of stacking layers of a powder material in which powder particles and adhesive particles are mixed, delivering a binding agent thereto to dissolve the adhesive material particles, and solidifying them to thereby form a three-dimensional object (see PTL 4), and a method of dissolving a powder material in which a base material such as glass and ceramic is coated with a hydrophobic resin, and a resin coated with a hydrophobic solvent such as limonene, and solidifying them to thereby form a three-dimensional object (see PTL 5).

CITATION LIST

Patent Literature

PTL 1 Japanese Patent Application Laid-Open (JP-A) No. 2000-328106
PTL 2 JP-A No. 2006-200030
PTL 3 JP-A No. 2003-48253
PTL 4 JP-A No. 2004-330743
PTL 5 JP-A No. 2005-297325
PTL 6 U.S. Pat. No. 7,049,363

SUMMARY OF INVENTION

Technical Problem

However, in the case of supplying the adhesive material according to an inkjet method, there are problems that the nozzle head used may be clogged, selection of adhesive materials that can be used is limited, cost efficiency is poor, etc.

Further, there is a problem in the technique described in PTL 4 that it is difficult to impart a sufficient strength and precision to a three-dimensional object because even though the adhesive particles are supplied with a binding material and dissolved, the obtained dissolved adhesive solution tends not to spread uniformly between the powder particles.

According to the technique described in PTL 5, limonene has a low volatility and may tend to remain in a three-dimensional object and reduce the strength thereof. Further, a low volatility solvent such as toluene has a problem in safety. Furthermore, in order for the material to be bound together only at the coating resin, it is necessary to provide the coating resin film with a large thickness (it is necessary to use the resin in a large amount). Therefore, there are problems that a three-dimensional object to be obtained may not have a sufficient precision, and that the density of the base material in the three-dimensional object may be low. Particularly, in the case of a metal sintered object or a ceramic sintered object, in which case, the resin is removed finally for a post-treatment such as sintering, the inability to make the density of the base material sufficiently high makes the problems with the strength and precision of the sintered object remarkable.

PTL 6 proposes, as a material usable in 3D printing, particles composed of a liquid as a first constituent element, and a binder soluble in the liquid as a second constituent element. The literature discloses addition of a polymerization initiator such as a peroxide to the liquid or the binder. However, because of its characteristic of undergoing a spontaneous decomposition under heat or light to produce radicals and thereby initiate a reaction, a polymerization initiator such as a peroxide decomposes under heat and light environmental conditions and becomes inactive. Therefore, there is a problem that a liquid containing such a polymerization initiator has a poor storage stability.

Hence, the present invention aims to solve the conventional problems described above and achieve the following object. That is, an object of the present invention is to provide a three-dimensional object formation method that can form a three-dimensional object having a complex stereoscopic (three-dimensional (3D)) shape easily and efficiently by using a powder material of a metal, etc., without causing a shape collapse before sintering, etc., and with a dimensional precision.

Solution to Problem

A solution to the problems described above is as follows.
A three-dimensional object formation method of the present invention includes forming a three-dimensional object by at least repeating the steps of:
forming a powder material layer using a powder material for three-dimensional object formation containing a base material coated with an organic material; and
hardening a predetermined region of the powder material layer by delivering a hardening liquid containing a cross-linking agent cross-linkable with the organic material to the powder material layer formed in the formation of a powder material layer.

In the three-dimensional object formation method of the present invention, a powder material layer is formed with a powder material for three-dimensional object formation containing a base material coated with an organic material in the step of forming a layer of a powder material for three-dimensional object formation. Then, a hardening liquid containing a cross-linking agent cross-linkable with the organic material is delivered to the powder material layer formed in the step of forming a powder material layer in the step of hardening the powder material layer in order to harden a predetermined region of the powder material layer. That is, the powder material for three-dimensional object formation contains the base material coated with the organic material. When the hardening liquid is delivered to the organic material, the organic material is dissolved and cross-linked by the effect of the cross-linking agent contained in the hardening liquid, to thereby form a three-dimensional network. Therefore, the layer of the powder material for three-dimensional object formation is hardened with a dimensional precision and a favorable strength.

Through repetition of these steps, a complex three-dimensional object is formed easily, efficiently, without shape collapse before sintering, etc., and with a dimensional precision. As the obtained three-dimensional object has a favorable strength, it does not undergo a shape collapse even when it is held in a hand or air-blown in order for excess powder material for three-dimensional object formation to be removed, and afterwards, can be subjected to sintering, etc. with ease. In the three-dimensional object, the base material is present densely (at a high filling rate), and the organic material is present only slightly around the base material particles. Therefore, when a compact (a sintered object) is obtained through the afterward sintering, etc., the obtained compact includes few unnecessary voids, and a compact (sintered object) having a beautiful appearance can be obtained.

A powder material for three-dimensional object formation of the present invention is a powder material for three-dimensional object formation used in the three-dimensional object formation method of the present invention, and contains the base material coated with the organic material.

In the powder material for three-dimensional object formation of the present invention, the organic material coating the base material can be dissolved and made cross-linkable by the effect of the hardening liquid. Therefore, when the hardening liquid is delivered to the organic material, the organic material is dissolved and cross-linked by the effect of the cross-linking agent contained in the hardening liquid. Hence, when a thin layer is formed with the powder material for three-dimensional object formation of the present invention and the hardening liquid is activated on the thin layer, the thin layer is hardened.

A hardening liquid of the present invention is a hardening liquid used in the three-dimensional object formation method of the present invention, and contains a cross-linking agent cross-linkable with the organic material.

According to the hardening liquid of the present invention, when the hardening liquid is delivered to the organic material, the organic material is dissolved and cross-linked by the effect of the cross-linking agent contained in the hardening liquid.

The "cross-linking agent" of the present invention means a compound that has a site cross-linking-reactive with a functional group of cross-linking targets (organic materials such as a polymer, etc.), and by a cross-linking reaction, itself becomes the constituent element of the bonding portion of a cross-linking bond between cross-linking targets. Hence, the cross-linking agent is conceptually different from a so-called "initiator" such as a peroxide (organic peroxide) and a reducing substance that does not itself become the constituent element of a cross-linking bonding portion but initiates or promotes a radical reaction by undergoing a spontaneous decomposition under heat or light to thereby produce free radicals, adding to an unsaturated monomer, opening a double bond and simultaneously causing a new radical reaction, and repeating these processes to thereby promote polymerization, or by withdrawing hydrogen atoms bonded with carbon atoms of saturated compounds to produce new radicals and let these radicals recombine to thereby form a bridge between these saturated compounds. The "cross-linking agent" of the present invention is clearly distinguished from the initiator.

A three-dimensional object formation kit contains the powder material for three-dimensional object formation of the present invention and the hardening liquid of the present invention.

A three-dimensional object formation apparatus of the present invention includes:

a powder material layer forming unit configured to form a layer of a powder material for three-dimensional object formation containing a base material coated with an organic material;

a hardening liquid delivering unit configured to deliver a hardening liquid containing a cross-linking agent cross-linkable with the organic material in order to harden a predetermined region of the layer of the powder material for three-dimensional object formation formed by the powder material layer forming unit;

a powder material containing unit containing the powder material for three-dimensional object formation; and a hardening liquid containing unit containing the hardening liquid.

Advantageous Effects of Invention

The present invention can provide a three-dimensional object formation method that can solve the conventional problems described above, and can form a three-dimensional object having a complex stereoscopic (three-dimensional (3D)) shape easily and efficiently by using a powder material of a metal, etc., without causing a shape collapse before sintering, etc., and with a dimensional precision.

Figure 1:
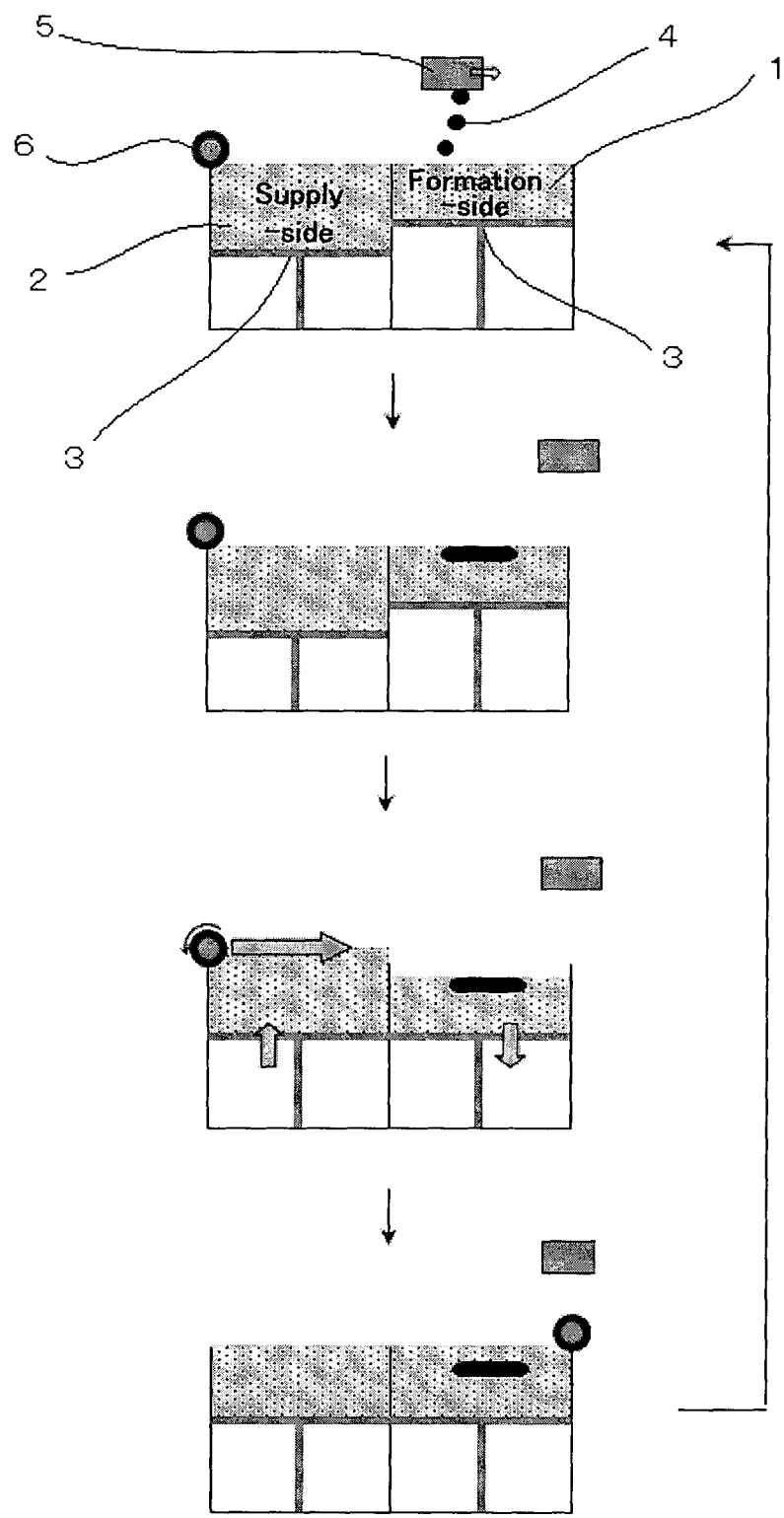
FIG. 1 is a schematic diagram showing an example of a powder stack formation apparatus of the present invention.

DESCRIPTION OF EMBODIMENTS (Powder Material for Three-Dimensional Object Formation)

A powder material for three-dimensional object formation of the present invention contains a base material coated with an organic material, and further contains other components, etc. according to necessity. The material coating the base material is principally an organic material, but may contain an inorganic material according to necessity.

The powder material for three-dimensional object formation is used in a three-dimensional object formation method of the present invention described later.

—Base Material—

The base material is not particularly limited, and an arbitrary base material may be selected according to the purpose as long as it has a shape of a powder or particles. Examples thereof include metal, ceramics, carbon, polymer, wood, a material having affinity to a living body, and sand.

In terms of obtaining a three-dimensional object having a high strength, metal, ceramics, etc. that can be finally subjected to sintering are preferable.

Preferable examples of the metal include stainless (SUS) steel, iron, copper, titanium, and silver. Examples of the stainless (SUS) steel include SUS 316L.

Examples of the ceramics include metal oxide. Specific examples include silica ($SiO_2$), alumina ($Al_2O_3$), zirconia ($ZrO_2$), and titania ($TiO_2$).

Examples of the carbon include graphite, graphene, carbon nanotube, carbon nanohorn, and fullerene.

Examples of the polymer include a publicly-known resin insoluble to water.

Examples of the wood include wooden chip and cellulose.

Examples of the material having affinity to a living body include polylactic acid and calcium phosphate.

One of these materials may be used alone, or two or more of these may be used in combination.

In the present invention, commercially available particles or powder made from these materials may be used as the base material.

Examples of the commercially available product include SUS 316L (PSS316L manufactured by Sanyo Special Steel Co., Ltd.), $SiO_2$ (ECCERICA SE-15K manufactured by Tokuyama Corporation), $AlO_2$ (TAIMICRON TM-5 D manufactured by Taimei Chemicals Co., Ltd.), and $ZrO_2$ (TZ-B53 manufactured by Tosoh Corporation).

The base material may be subjected to a publicly-known surface (reforming) treatment with a view to increasing affinity to the organic material, etc.

The average particle diameter of the base material is not particularly limited and may be appropriately selected according to the purpose. However, it is preferably from 0.1 μm to 500 μm, more preferably from 5 μm to 300 μm, and yet more preferably from 15 μm to 250 μm.

When the average particle diameter is from 0.1 μm to 500 μm, the formation efficiency of a three-dimensional object is good, and treatability and a handling property of a three-dimensional object are good. When the average particle diameter is 500 μm or less, a rate at which a thin layer is filled with the powder material for three-dimensional object formation is good when a thin layer is formed with the powder material for three-dimensional object formation, and voids or the like are hardly produced in a three-dimensional object to be obtained.

The average particle diameter of the base material can be measured with a publicly-known particle size meter, e.g., MICROTRACK HRA (manufactured by Nikkiso Co, Ltd.), according to a publicly-known method.

The particle size distribution of the base material is not particularly limited and may be appropriately selected according to the purpose.

The contour, surface area, circularity, fluidity, wettability, etc. of the base material may be appropriately selected according to the purpose.

—Organic Material—

It is only necessary that the organic material dissolve in a hardening liquid and have a property of being able to be cross-linked by the effect of a cross-linking agent contained in the hardening liquid.

In the present invention, the organic material is said to have solubility when 1 g of the organic material is mixed in 100 g of a solvent constituting a hardening liquid having a temperature of 30° C. and stirred, and 90% by mass or greater of the organic material is dissolved.

The viscosity of the organic material when it is in the form of a 4% by mass (w/w %) solution having a temperature of 20° C. is preferably 40 mPa·s or lower, more preferably from 1 mPa·s to 35 mPa·s, and particularly preferably from 5 mPa·s to 30 mPa·s.

When the viscosity is 40 mPa·s or lower, a strength of a hardened object (a three-dimensional object) made from (a layer) of the powder material for three-dimensional object formation formed by delivering the hardening liquid to the powder material for three-dimensional object formation is improved, and it becomes harder for the hardened object to undergo a problem of shape collapse or the like in an afterward treatment or handling such as sintering, and a dimensional precision of a hardened object (a three-dimensional object) made from (a layer) of the powder material for three-dimensional object formation formed by delivering the hardening liquid to the powder material for three-dimensional object formation tends to be improved.

The viscosity can be measured according to, for example, JIS K7117.

The organic material is not particularly limited, but is preferably water-soluble in terms of treatability, environmental hazardousness, etc. Examples thereof include a water-soluble resin, and a water-soluble prepolymer. When a powder material for three-dimensional object formation uses such a water-soluble organic material, an aqueous medium can be used as the medium of the hardening liquid likewise. Further, when disposing of or recycling the powder material, it is easy to separate the organic material and the base material from each other with a water treatment.

Examples of the water-soluble resin include a polyvinyl alcohol resin, a polyacrylic acid resin, a cellulose resin, starch, gelatin, a vinyl resin, an amide resin, an imide resin, an acrylic resin, and polyethylene glycol.

These may be a homopolymer or a heteropolymer (a copolymer), may be modified or have a publicly-known functional group introduced, or may be in the form of a salt, as long as they have the water-solubility described above.

Hence, when the water-soluble resin is the polyvinyl alcohol resin, it may be polyvinyl alcohol or polyvinyl alcohol modified with an acetoacetyl group, an acetyl group, silicone, or the like (acetoacetyl group-modified polyvinyl alcohol, acetyl group-modified polyvinyl alcohol, silicone-modified polyvinyl alcohol, or the like), or may be a butanediol/vinyl alcohol copolymer or the like. When the water-soluble resin is the polyacrylic acid resin, it may be a polyacrylic acid or may be a salt such as sodium polyacrylate. When the water-soluble resin is the cellulose resin, it may be cellulose, or may be carboxymethyl cellulose (CMC) or the like. When the water-soluble resin is the acrylic resin, it may be polyacrylic acid, an acrylic acid/maleic anhydride copolymer, or the like.

Examples of the water-soluble prepolymer include an adhesive water-soluble isocyanate prepolymer contained in a water sealant.

Examples of organic materials and resins that are not water-soluble include acrylic, maleic acid, silicone, butyral, polyester, polyvinyl acetate, a vinyl chloride/vinyl acetate copolymer, polyethylene, polypropylene, polyacetal, an ethylene/vinyl acetate copolymer, an ethylene/(meth)acrylic acid copolymer, an α-olefin/maleic anhydride-based copolymer, an esterified α-olefin/maleic anhydride-based copolymer, polystyrene, poly(meth)acrylic acid ester, an α-olefin/maleic anhydride/vinyl group-containing monomer copolymer, a styrene/maleic anhydride copolymer, a styrene/(meth)acrylic acid ester copolymer, polyamide, an epoxy resin, a xylene resin, a ketone resin, a petroleum resin, rosin or a derivative thereof, a coumarone-indene resin, a terpene resin, a polyurethane resin, a styrene/butadiene rubber, polyvinyl butyral, a synthetic rubber such as a nitrile rubber, an acrylic rubber, and an ethylene/propylene rubber, and nitrocellulose.

In the present invention, an organic material having a cross-linkable functional group is preferable among the examples of the organic material. The cross-linkable functional group is not particularly limited, and an arbitrary cross-linkable functional group may be selected according to the purpose. Examples thereof include a hydroxyl group, an amide group, a phosphoric group, a thiol group, an acetoacetyl group, and an ether bond.

It is preferable that the organic material have a cross-linkable functional group, because this makes it easy for the organic material to be cross-linked and form a hardened object (a three-dimensional object). Among such organic materials, a polyvinyl alcohol resin having an average degree of polymerization of from 400 to 1,100 is preferable. Furthermore, a modified polyvinyl alcohol resin having a cross-linkable functional group introduced into the molecule as described above is preferable. An acetoacetyl group-modified polyvinyl alcohol resin is particularly preferable. For example, when a polyvinyl alcohol resin has an acetoacetyl group, a metal in the cross-linking agent contained in the hardening liquid greatly assists a bending strength of the acetoacetyl group, which can hence easily form a complex three-dimensional network structure (a cross-linked structure) via the metal.

One kind of an acetoacetyl group-modified polyvinyl alcohol resin may be used, or two or more kinds of acetoacetyl group-modified polyvinyl alcohol resins having different properties such as viscosity and saponification degree may be used in combination. It is more preferable to use acetoacetyl group-modified polyvinyl alcohol resins having an average degree of polymerization of from 400 to 1,100.

As the organic material, one kind of an organic material may be used alone, or two or more kinds of organic materials may be used in combination. The organic material may be an appropriately synthesized product or may be a commercially available product.

Examples of the commercially available product include polyvinyl alcohols (PVA-205C and PVA-220C manufactured by Kuraray Co., Ltd.), a polyacrylic acid (JULIMER AC-10 manufactured by Toagosei Co., Ltd.), a sodium polyacrylate (JULIMER AC-103P manufactured by Toagosei Co., Ltd.), an acetoacetyl group-modified polyvinyl alcohol (GOHSENX Z-300, GOHSENX Z-100, GOHSENX Z-200, GOHSENX Z-205, GOHSENX Z-210, and GOHSENX Z-220 manufactured by Nippon Synthetic Chemical Industry Co., Ltd.), a carboxy group-modified polyvinyl alcohol (GOHSENX T-330, GOHSENX T-350, and GOHSENX T-330T manufactured by Nippon Synthetic Chemical Industry Co., Ltd.), a butanediol/vinyl alcohol copolymer (NICHIGO G-POLYMER OKS-8041 manufactured by Nippon Synthetic Chemical Industry Co., Ltd.), a carboxymethyl cellulose sodium (CELLOGEN 5A and CELLOGEN 6A manufactured by Daiichi Kogyo Seiyaku Co., Ltd.), starch (HISTARD PSS-5 manufactured by Sanwa Starch Co., Ltd.), and gelatin (BEMATRIX GELATIN manufactured by Nitta Gelatin Inc.).

The coating thickness of the organic material on the base material is preferably from 5 nm to 1,000 nm, more preferably from 5 nm to 500 nm, yet more preferably from 50 nm to 300 nm, and particularly preferably from 100 nm to 200 nm on an average thickness basis.

Because the present invention utilizes a hardening effect by means of a cross-linking agent, the coating thickness can be made smaller than in conventional techniques, and a strength and a precision can both be satisfied even with a thin film.

When the average thickness as the coating thickness is 5 nm or greater, a hardened object (a three-dimensional object) made of (a layer of) the powder material for three-dimensional object formation formed by delivering the hardening liquid to the powder material for three-dimensional object formation can be enhanced in the strength, and does not undergo problems of shape collapse or the like during an afterward treatment or handling such as sintering. When the average thickness is 1,000 nm or less, a hardened object (a three-dimensional object) made of (a layer of) the powder material for three-dimensional object formation formed by delivering the hardening liquid to the powder material for three-dimensional object formation can be enhanced in the dimensional precision.

The average thickness can be measured by, for example, embedding the powder material for three-dimensional object formation in an acrylic resin or the like, exposing a surface of the base material by etching or the like, and then using a scanning tunnel microscope (STM), an atomic force microscope (AFM), a scanning electron microscope (SEM), or the like.

The coverage (area ratio) at which the surface of the base material is covered with the organic material is not particularly limited and may be appropriately selected according to the purpose. However, it is preferably 15% or greater, more preferably 50% or greater, and particularly preferably 80% or greater.

When the coverage is 15% or greater, a hardened object (a three-dimensional object) made of (a layer of) the powder material for three-dimensional object formation formed by delivering the hardening liquid to the powder material for three-dimensional object formation can have a sufficient strength, and does not undergo problems of shape collapse or the like during an afterward treatment or handling such as sintering, or a hardened object (a three-dimensional object) made of (a layer of) the powder material for three-dimensional object formation formed by delivering the hardening liquid to the powder material for three-dimensional object formation can be enhanced in the dimensional precision.

For the coverage, a photograph of the powder material for three-dimensional object formation may be observed, and based on the powder material for three-dimensional object formation captured in the two-dimensional photograph, an average ratio (%) of an area of a portion of each particle of the powder material for three-dimensional object formation that is covered with the organic material to the whole area of the surface of the particle may be calculated as the coverage. Alternatively, the coverage may be measured by performing elemental mapping of the portion covered with the organic material according to energy dispersive X-ray spectrometry such as SEM-EDS.

—Other Components—

The other components are not particularly limited, and arbitrary components may be selected according to the purpose. Examples thereof include a fluidizer, a filler, a leveling agent, and a sintering aid. It is preferable that the powder material for three-dimensional object formation contain the fluidizer, because this makes it possible to form a layer or the like of the powder material for three-dimensional object formation easily and efficiently. It is preferable that the powder material for three-dimensional object formation contain the filler, because this makes it harder for voids or the like to be produced in a hardened object (a three-dimensional object) to be obtained. It is preferable that the powder material for three-dimensional object formation contain the leveling agent, because this improves the wettability of the powder material for three-dimensional object formation and makes handling or the like easy. It is preferable that the powder material for three-dimensional object formation contain the sintering aid, because when a hardened object (a three-dimensional object) to be obtained is subjected to a sintering treatment, it can be sintered at a lower temperature.

—Production of Powder Material for Three-Dimensional Object Formation—

A method for producing the powder material for three-dimensional object formation is not particularly limited, and an arbitrary method may be selected according to the purpose. Examples thereof include a method of coating the base material with the organic material according to a publicly-known coating method.

A method for coating a surface of the base material with the organic material is not particularly limited, and an arbitrary method may be selected from publicly-known coating methods. Examples of such coating methods include a rolling fluidized coating method, a spray drying method, a stirring mixing adding method, a dipping method, and a kneader coating method. These coating methods can be practiced with publicly-known commercially available coating machines, a granulating machine, etc.

—Physical Properties, Etc. Of Powder Material for Three-Dimensional Object Formation—

The average particle diameter of the powder material for three-dimensional object formation is not particularly limited and may be appropriately selected according to the purpose. However, it is preferably from 3 μm to 250 μm, more preferably from 3 μm to 200 μm, yet more preferably from 5 μm to 150 and particularly preferably from 10 μm to 85 μm.

When the average particle diameter is 3 μm or greater, the powder material can have a good fluidity, a layer of the powder material can be formed easily, and a surface of a stacked layer can have a good smoothness. This tends to improve the formation efficiency of a three-dimensional object, improve treatability and a handling property, and improve a dimensional precision. When the average particle diameter is 250 μm or less, particles of the powder material have little room between them, which provides a low voidage in an object to be obtained and contributes to enhancement of the strength. Therefore, a preferable range of the average particle diameter for satisfying both of a dimensional precision and a strength is from 3 μm to 250 μm.

The particle size distribution of the powder material for three-dimensional object formation is not particularly limited and may be appropriately selected according to the purpose.

As a property of the powder material for three-dimensional object formation, an angle of repose thereof is preferably 60 degrees or less, more preferably 50 degrees or less, and yet more preferably 40 degrees or less.

When the angle of repose is 60 degrees or less, the powder material for three-dimensional object formation can be placed at a desired position of a support member efficiently and stably.

The angle of repose can be measured with, for example, a powder characteristic measurement instrument (POWDER TESTER TYPE PT-N manufactured by Hosokawa Micron Inc.).

The powder material for three-dimensional object formation of the present invention can be favorably used for easy and efficient formation of various compacts and structures, and can be particularly favorably used for a three-dimensional object formation kit of the present invention, the hardening liquid of the present invention, a three-dimensional object formation method of the present invention, and a three-dimensional object formation apparatus of the present invention to be described later.

A structure having a complex three-dimensional shape can be formed easily, efficiently, and dimensionally precisely, only by delivering the hardening liquid of the present invention to the powder material for three-dimensional object formation of the present invention. A structure obtained in this way is a hardened object (a three-dimensional object) having a sufficient hardness, and excellent in treatability and a handling property without undergoing a shape collapse when held in a hand, set in or out from a mold, or air-blown in order for excess powder material for three-dimensional object formation to be removed. The hardened object may be used as is, or, as a hardened object to be sintered, may further be subjected to a sintering treatment to be formed as a compact (a sintered compact of the three-dimensional object). When it is subjected to a sintering treatment, no unnecessary voids may be produced in the compact to be obtained after the sintering, and a compact with a beautiful appearance can be obtained easily.

(Hardening Liquid)

The hardening liquid of the present invention is a hardening liquid used in the three-dimensional object formation method of the present invention, contains a cross-linking agent cross-linkable with the organic material, contains a medium (solvent) for dissolving the organic material and a component for promoting the dissolution, and further contains other components according to necessity.

When the hardening liquid is delivered to the organic material, the organic material is dissolved and cross-linked by the effect of the cross-linking agent contained in the hardening liquid.

—Medium—

The medium is not particularly limited except that it should be able to dissolve the organic material coating the base material. Examples of the medium include: an aqueous medium such as water, alcohol such as ethanol, ether, and ketone; an ether-based solvent such as aliphatic hydrocarbon, and glycol ether; an ester-based solvent such as ethyl acetate; a ketone-based solvent such as methyl ethyl ketone; and a higher alcohol. Among these, an aqueous medium is preferable and water is more preferable in terms of environmental hazardousness and discharging stability when delivering the hardening liquid according to an inkjet method (i.e., temporal viscosity change should be little). The aqueous medium may be water that contains any other component than water such as alcohol in a small amount. Further, when the medium of the hardening liquid is an aqueous medium, it is preferable that the organic material principally contain a water-soluble organic material.

—Cross-Linking Agent—

The cross-linking agent is not particularly limited, and an arbitrary cross-linking agent may be selected according to the purpose as long as it has a property of being able to cross-link the organic material. Examples thereof include a metal salt, a metal complex, a zirconia-based cross-linking agent, a titanium-based cross-linking agent, a water-soluble organic cross-linking agent, and a chelating agent.

Examples of the zirconia-based cross-linking agent include zirconium oxychloride, and ammonium zirconium carbonate.

Examples of the titanium-based cross-linking agent include titanium acylate, and titanium alkoxide.

Examples of the water-soluble organic cross-linking agent include a carbodiimide group-containing compound, and a bis-vinyl sulfone compound.

Examples of the chelating agent include an organic titanium chelate, and an organic zirconia chelate.

One of these may be used alone, or two or more of these may be used in combination. Among these, a metal salt is more preferable.

Preferable examples of the metal salt include a metal salt that ionizes a divalent or higher cationic metal in water. Preferable specific examples thereof include zirconium oxychloride octahydrate (tetravalent), aluminum hydroxide (trivalent), magnesium hydroxide (divalent), a titanium lactate ammonium salt (tetravalent), basic aluminum acetate (trivalent), an ammonium salt of zirconium carbonate (tetravalent), titanium triethanol aminate (tetravalent), a glyoxylic acid salt and a zirconium lactate ammonium salt.

These may be commercially available products. Examples of commercially available products include zirconium oxychloride octahydrate (zirconium oxychloride manufactured by Daiichi Kigenso Kagaku Kogyo Co., Ltd.), aluminum hydroxide (manufactured by Wako Pure Chemical Industries, Ltd.), magnesium hydroxide (manufactured by Wako Pure Chemical Industries, Ltd.), a titanium lactate ammonium salt (ORGATIX TC-300 manufactured by Matsumoto Fine Chemical Co., Ltd.), a zirconium lactate ammonium salt (ORGATIX ZC-300 manufactured by Matsumoto Fine Chemical Co., Ltd.), basic ammonium acetate (manufactured by Wako Pure Chemical Industries Ltd.), a bis-vinyl sulfone compound (VS-B (K-FJC) manufactured by Fuji Fine Chemical Co., Ltd.), an ammonium salt of zirconium carbonate (ZIRCOZOL AC-20 manufactured by Daiichi Kigenso Kagaku Kogyo Co., Ltd.), titanium triethanol aminate (ORGATIX TC-400 manufactured by Matsumoto Fine Chemical Co., Ltd.), a glyoxylic acid salt (SAFELINK SPM-01 manufactured by Nippon Synthetic Chemical Industry Co., Ltd.), and adipic acid dihydrazide (manufactured by Otsuka Chemical Co., Ltd.). It is preferable that the metal of the metal salt have a valence of 2 or greater, because this can improve the cross-linking strength, and provide a favorable strength to the three-dimensional object to be obtained.

A lactic acid ion is preferable as a ligand of the cationic metal, because it is excellent in discharging stability (temporal storage stability) of the hardening liquid.

A cross-linking agent in which the ligand of the cationic metal is a carbonic acid ion, such as zirconium ammonium carbonate, produces a self-polymerization reaction in an aqueous solution, which makes it easier for the properties of the cross-linking agent to change. Therefore, in terms of discharging stability, it is preferable to use a cross-linking agent in which the ligand of the cationic metal is a lactic acid ion. However, addition of a chelating agent such as a gluconic acid and triethanol amine can suppress the self-polymerization reaction of zirconium ammonium carbonate in an aqueous solution, and can improve discharging stability.

—Other Components—

As the other components, arbitrary components may be selected depending on various conditions such as the type of the unit configured to deliver the hardening liquid, frequency and amount of use, etc. For example, when the hardening liquid is delivered according to an inkjet method, a component may be selected depending on the influence on a nozzle head of an inkjet printer or the like, such as clogging. Examples of the other components include a preservative, an antiseptic agent, a stabilizing agent, and a pH adjustor.

A method for preparing the hardening liquid is not particularly limited, and an arbitrary method may be selected according to the purpose. Examples thereof include a method of adding and mixing the cross-linking agent, and according to necessity, the other components in the aqueous medium, and dissolving them therein.

The content (concentration) of the cross-linking agent in the hardening liquid is not particularly limited, and may be appropriately selected according to the purpose. However, it is preferably a concentration at which the cross-linking agent is from 0.1 parts by mass to 50 parts by mass (% by mass), more preferably a concentration at which the cross-linking agent is from 0.5 parts by mass to 40 parts by mass (% by mass), and particularly preferably from 1 part by mass to 35 parts by mass (% by mass), relative to 100 parts by mass of the organic material.

When the concentration is 0.1% by mass or higher, a hardened object (a three-dimensional object) made of (a layer of) the powder material for three-dimensional object formation formed by delivering the hardening liquid to the powder material for three-dimensional object formation can be enhanced in the strength, and does not undergo problems of shape collapse or the like during an afterward treatment or handling such as sintering. When the concentration is 50% by mass or lower, a hardened object (a three-dimensional object) made of (a layer of) the powder material for three-dimensional object formation formed by delivering the hardening liquid to the powder material for three-dimensional object formation can be enhanced in the dimensional precision.

(Three-Dimensional Object Formation Kit)

A three-dimensional object formation kit of the present invention includes the powder material for three-dimensional object formation of the present invention, and the hardening liquid of the present invention, and further includes other components according to necessity.

In the three-dimensional object formation kit of the present invention, the cross-linking agent needs not be contained in the hardening liquid, but may be included in the form of a solid. The kit may be provided so as to allow the cross-linking agent to be mixed with an aqueous medium and prepared as the hardening liquid, in use.

The three-dimensional object formation kit of the present invention can be favorably used for formation of various compacts and structures, and can be particularly favorably used for a three-dimensional object formation apparatus of the present invention and a three-dimensional object to be obtained according to the present invention, which are to be described later.

When a structure is formed with the three-dimensional object formation kit of the present invention, a structure having a complex three-dimensional shape can be formed easily, efficiently, and dimensionally precisely, only by activating the hardening liquid on the powder material for three-dimensional object formation and drying them if necessary. The structure obtained in this way is a hardened object (a three-dimensional object) having a sufficient hardness, and excellent in treatability and a handling property without undergoing a shape collapse when held in a hand, set in or out from a mold, or air-blown in order for excess powder material for three-dimensional object formation to be removed. The hardened object may be used as is, or, as a hardened object to be sintered, may further be subjected to a sintering treatment to be formed as a compact (a sintered compact of the three-dimensional object). When it is subjected to a sintering treatment, no unnecessary voids may be produced in the compact to be obtained after the sintering, and a compact with a beautiful appearance can be obtained easily.

<Three-Dimensional Object>

A three-dimensional object to be obtained according to the present invention is either of a hardened object obtained by delivering the hardening liquid of the present invention to the powder material for three-dimensional object formation of the present invention described above, and a hardened object obtained by using the three-dimensional object formation kit of the present invention described above, and delivering the hardening liquid included in the three-dimensional object formation kit to the powder material for three-dimensional object formation included therein, and is used as a hardened object to be sintered, which is for forming a compact (a sintered compact of the three-dimensional object) by sintering.

The three-dimensional object is an object obtained only by delivering the hardening liquid to the powder material for three-dimensional object formation, but has a sufficient strength. In the three-dimensional object, the base material is present densely (at a high filling rate), and the organic material is present only slightly around the base material particles. Therefore, when a compact (a sintered compact) is obtained through the afterward sintering, etc., the obtained compact includes no unnecessary voids (marks of wax removal) because the amount of organic components to be volatilized (the amount of wax to be removed) can be suppressed unlike in a hardened object made of a conventional powder or particles using an adhesive or the like, and a compact (sintered compact) having a beautiful appearance can be obtained.

The strength of the three-dimensional object is, for example, such a level at which the object would not undergo a shape collapse or the like when the surface of the object is scrubbed, and a level at which it would not have a crack or the like when it is air-blown with an air gun with a nozzle caliber of 2 mm and an air pressure of 0.3 mPa, from a distance of 5 cm away.

(Formation Method and Formation Apparatus of Three-Dimensional Object)

A three-dimensional object formation method of the present invention includes a powder material layer forming step and a powder material layer hardening step, and further includes other steps such as a sintering step according to necessity.

The method is characterized by forming a three-dimensional object by repeating the powder material layer forming step and the powder material layer hardening step.

A three-dimensional object formation apparatus of the present invention includes a powder material layer forming unit, a hardening liquid delivering unit, a powder material containing unit containing a powder material, and a hardening liquid containing unit containing a hardening liquid, and further includes other units such as a hardening liquid supplying unit and a sintering unit according to necessity.

—Powder Material Layer Forming Step and Powder Material Layer Forming Unit—

The powder material layer forming step is a step of using a powder material for three-dimensional object formation containing a base material coated with an organic material, and forming a layer of the powder material.

The powder material layer forming unit is a unit configured to use a powder material for three-dimensional object formation containing a base material coated with an organic material, and form a layer of the powder material.

It is preferable that the layer of the powder material for three-dimensional object formation be formed over a support member.

—Support Member—

The support member is not particularly limited, and an arbitrary support member may be selected according to the purpose as long as the powder material for three-dimensional object formation can be placed over it. Examples thereof include a table having a surface over which to place the powder material for three-dimensional object formation, and a base plate included in an apparatus shown in FIG. 1 of JP-A No. 2000-328106.

A surface of the support member, i.e., a placement surface over which to place the powder material for three-dimensional object formation may be, for example, a smooth surface, a rough surface, a flat surface, or a curved surface. However, it is preferable that the placement surface have a low affinity with the organic material contained in the powder material for three-dimensional object formation, when the organic material is dissolved and becomes cross-linked by the effect of the cross-linking agent.

It is preferable that the affinity of the placement surface with respect to the dissolved and cross-linked organic material be lower than the affinity of the base material with respect to the dissolved and cross-linked organic material, because this makes it easy to remove the obtained three-dimensional object from the placement surface.

—Formation of Powder Material Layer—

A method for placing the powder material for three-dimensional object formation over the support member is not particularly limited, and an arbitrary method may be selected according to the purpose. Preferable examples of a method for placing the powder material as a thin layer includes a method using a publicly-known counter rolling machine (a counter roller) or the like, which is used in a selective laser sintering method described in Japanese Patent (JP-B) No. 3607300, a method of spreading the powder material for three-dimensional object formation into a thin layer with a member such as a brush, a roller, and a blade, a method of spreading the powder material for three-dimensional object formation into a thin layer by pressing the surface of the powder material with a pressing member, and a method of using a publicly-known powder stack formation apparatus.

Placing the powder material for three-dimensional object formation as a thin layer over the support member with the counter rolling machine (a counter roller), the brush or blade, the pressing member, or the like may be practiced as follows, for example.

With the counter rolling machine (a counter roller), the brush or roller, or blade, the pressing member, or the like, the powder material for three-dimensional object formation is placed over the support member that is disposed within an outer frame (may also be referred to as "mold", "hollow cylinder", "tubular structure", etc.) such that it can be lifted up or down while sliding over the inner wall of the outer frame. In this case, when a member that can be lifted up or down within the outer frame is used as the support member, the support member is disposed at a position slightly below the upper end opening of the outer frame, i.e., at a position below the upper end opening by an amount corresponding to the thickness of the layer of the powder material for three-dimensional object formation, and then the powder material for three-dimensional object formation is placed over the support member. In this way, the powder material for three-dimensional object formation can be placed as a thin layer over the support member.

When the hardening liquid is activated on the powder material for three-dimensional object formation placed as a thin layer in this way, the layer is hardened (the powder material layer hardening step).

Then, when the powder material for three-dimensional object formation is placed as a thin layer over the hardened thin layer obtained as above in the same manner as described above, and the hardening liquid is activated on the (layer of) the powder material for three-dimensional object formation placed as the thin layer, hardening occurs. This hardening occurs not only in the (layer of) the powder material for three-dimensional object formation placed as the thin layer, but also in the hardened thin layer present below it and obtained through the previous hardening. As a result, a hardened object (a three-dimensional object) having a thickness corresponding to about two layers of the powder material for three-dimensional object formation placed as the thin layer is obtained.

Further, placing the powder material for three-dimensional object formation as a thin layer over the support member can also be practiced in an automated manner easily with the publicly-known powder stacking machine. Typically, the powder stack formation apparatus includes a recoater configured to deposit a layer of the powder material for three-dimensional object formation, a movable supply tank configured to supply the powder material for three-dimensional object formation over the support member, and a movable shaping tank configured for the powder material for three-dimensional object formation to be placed and stacked as a thin layer. In the powder stack formation apparatus, it is possible to have the surface of the supply tank located slightly above the surface of the shaping tank constantly, by lifting up the supply tank, by lifting down the shaping tank, or by both, it is possible to place the powder material for three-dimensional object formation as a thin layer with the recoater functioning from the supply tank side, and it is possible to stack thin layers of the powder material for three-dimensional object formation by repeatedly moving the recoater.

The thickness of the layer of the powder material for three-dimensional object formation is not particularly limited, and may be appropriately selected according to the purpose. However, as the average thickness per layer, it is preferably from 30 μm to 500 μm, and more preferably form 60 μm to 300 μm.

When the thickness is 30 μm or greater, a hardened object (a three-dimensional object) made of (a layer of) the powder material for three-dimensional object formation formed by delivering the hardening liquid to the powder material for three-dimensional object formation can have a sufficient strength, and does not undergo problems of shape collapse or the like during an afterward treatment or handling such as sintering. When the thickness is 500 μm or less, a hardened object (a three-dimensional object) made of (a layer of) the powder material for three-dimensional object formation formed by delivering the hardening liquid to the powder material for three-dimensional object formation can be enhanced in the dimensional precision.

The average thickness is not particularly limited, and can be measured according to a publicly-known method.

—Powder Material Layer Hardening Step and Hardening Liquid Delivering Unit—

The powder material layer hardening step is a step of hardening a predetermined region of the powder material layer formed in the powder material layer forming step by delivering a hardening liquid containing a cross-linking agent cross-linkable with the organic material to the powder material layer.

The hardening liquid delivering unit is a unit configured to deliver a hardening liquid containing a cross-linking agent cross-linkable with the organic material in order to harden a predetermined region of the layer of the powder material for three-dimensional object formation formed by the powder material layer forming unit.

The method for delivering the hardening liquid to the powder material layer is not particularly limited, and an arbitrary method may be selected according to the purpose. Examples thereof include a dispenser method, a spraying method, and an inkjet method. For practicing these methods, a publicly-known apparatus can be favorably used as the hardening liquid delivering unit.

Among these, the dispenser method is excellent in liquid droplet quantitativity, but has a small coating coverage. The spraying method can form a minute discharge easily, has a wide coating coverage and excellent coating performance, but has poor liquid droplet quantitativity, and may have the powder fly away with a sprayed flow. Therefore, the inkjet method is particularly preferable for the present invention. The inkjet method is preferable in that it is better than the spraying method in liquid droplet quantitativity, has a wider coating coverage than that of the dispenser method, and can form a complex three-dimensional shape precisely and efficiently.

When the inkjet method is employed, the hardening liquid delivering unit has a nozzle capable of delivering the hardening liquid to the powder material layer according to the inkjet method. As the nozzle, a nozzle (a discharge head) of a publicly-known inkjet printer can be favorably used. Further, the inkjet printer can be favorably used as the hardening liquid delivering unit. Preferable examples of the inkjet printer include SG7100 manufactured by Ricoh Company Limited. The inkjet printer is preferable in that it can perform coating at a high speed, because it can drop a large amount of hardening liquid at a time, with a wide coating coverage.

In the present invention, when an inkjet printer capable of delivering the hardening liquid precisely at a high efficiency is used, the nozzle thereof or the head of the nozzle is not clogged or corroded, because the hardening liquid is free from a solid such as particles, and a polymeric high-viscosity material such as a resin. Further, when the hardening liquid is delivered (discharged) onto the layer of the powder material for three-dimensional object formation, it can penetrate into the organic material contained in the powder material for three-dimensional object formation efficiently, resulting in an excellent formation efficiency of a three-dimensional object. As a further advantage, a dimensionally precise hardened object with no unexpected volume expansion or the like can be obtained easily, in a short time, and efficiently, because no polymeric compound such as a resin is delivered.

In the hardening liquid, the cross-linking agent can also function as a pH adjustor. The pH of the hardening liquid, when the hardening liquid is delivered to a layer of the powder material for three-dimensional object formation according to the inkjet method, is preferably from 5 (mild acidic level) to 12 (basic level), and more preferably from 8 to 10 (weak basic level), in terms of preventing corroding or clogging of the nozzle head portion of the nozzle used. For the pH adjustment, a publicly-known pH adjustor may be used.

—Powder Material Containing Unit—

The powder material containing unit is a member in which the powder material for three-dimensional object formation is contained. The size, shape, material, etc, of the powder material containing unit are not particularly limited, and may be appropriately selected according to the purpose. Examples of the powder material containing unit include a storage tank, a bag, a cartridge, and a tank.

—Hardening Liquid Containing Unit—

The hardening liquid containing unit is a member in which the hardening liquid is contained. The size, shape, material, etc. of the hardening liquid containing unit are not particularly limited, and may be appropriately selected according to the purpose. Examples of the hardening liquid containing unit include a storage tank, a bag, a cartridge, and a tank.

—Other Steps and Other Units—

Examples of the other steps include a drying step, a sintering step, a surface protection treatment step, and a painting step.

Examples of the other units include a drying unit, a sintering unit, a surface protection treatment unit, and a painting unit.

The drying step is a step of drying a hardened object (a three-dimensional object) obtained in the powder material layer hardening step. In the drying step, not only moisture contained in the hardened object, but also an organic substance contained therein may be removed (wax removal). Examples of the drying unit include publicly-known driers.

The sintering step is a step of sintering a hardened object (a three-dimensional object) formed in the powder material layer hardening step. Through the sintering step, the hardened object can be formed into an integrated metal or ceramics compact (a sintered compact of the three-dimensional object). Examples of the sintering unit include publicly-known sintering furnaces.

The surface protection treatment step is a step of performing formation, etc, of a protection layer over the hardened object (three-dimensional object) formed in the powder material layer hardening step. Through the surface protection treatment step, durability, etc. with which, for example, the hardened object (three-dimensional object) can, as is, be served for use, etc. can be imparted to the surface of the hardened object (three-dimensional object). Specific examples of the protection layer include a water-fast layer, a weather-fast layer, a lightfast layer, a heat-insulating layer, and a gloss layer. Examples of the surface protection treatment unit include publicly-known surface protection treatment machines, such as a spraying machine and a coating machine.

The painting step is a step of painting the hardened object (three-dimensional object) formed in the powder material layer hardening step. Through the painting step, the hardened object (three-dimensional object) can be colored in a desired color. Examples of the painting unit include publicly-known painting machines, such as painting machines with spraying, a roller, and a brush.

FIG. 1 shows an example of a powder stack formation apparatus. The powder stack formation apparatus of FIG. 1 includes a formation-side powder storage tank 1 and a supply-side powder storage tank 2. These powder storage tanks each have a stage 3 capable of moving upward and downward, and have a thin layer made of the powder material for three-dimensional object formation formed on the stage 3.

The apparatus includes an inkjet head 5 above the formation-side powder storage tank 1, and a leveling machine 6 (hereinafter may be referred to as recoater). The inkjet head is configured to discharge a hardening liquid 4 toward the powder material for three-dimensional object formation in the formation-side powder storage tank. The leveling machine is configured to supply the powder material for three-dimensional object formation from the supply-side powder storage tank 2 to the formation-side powder storage tank 1, and to level off the surface of the powder material for three-dimensional object formation in the formation-side powder storage tank 1.

A hardening liquid 4 is dropped from the inkjet head 5 onto the powder material for three-dimensional object formation in the formation-side powder storage tank 1. The position onto which the hardening liquid 4 is dropped is determined based on two-dimensional image data (slice data) representing a plurality of planer layers into which a three-dimensional object having a finally desired shape is sliced.

After image drawing on one layer is completed, the stage 3 of the supply-side powder storage tank 2 is lifted up, and the stage 3 of the formation-side powder storage tank 1 is lifted down, which produces a height difference. An amount of the powder material for three-dimensional object formation corresponding to the height difference is moved to the formation-side powder storage tank 1 by the leveling machine 6.

In this way, one new layer of the powder material for three-dimensional object formation is formed over the surface of the (layer) of the powder material for three-dimensional object formation over which an image has been drawn before. The thickness of one layer of the powder material for three-dimensional object formation is about from several ten μm to 100 μm.

Then, an image is drawn over the newly formed layer of the powder material for three-dimensional object formation, based on the slice data of the second layer. Through repetition of this process, a three-dimensional object is obtained, and heated and dried with an unillustrated drying unit.

Figure 2:
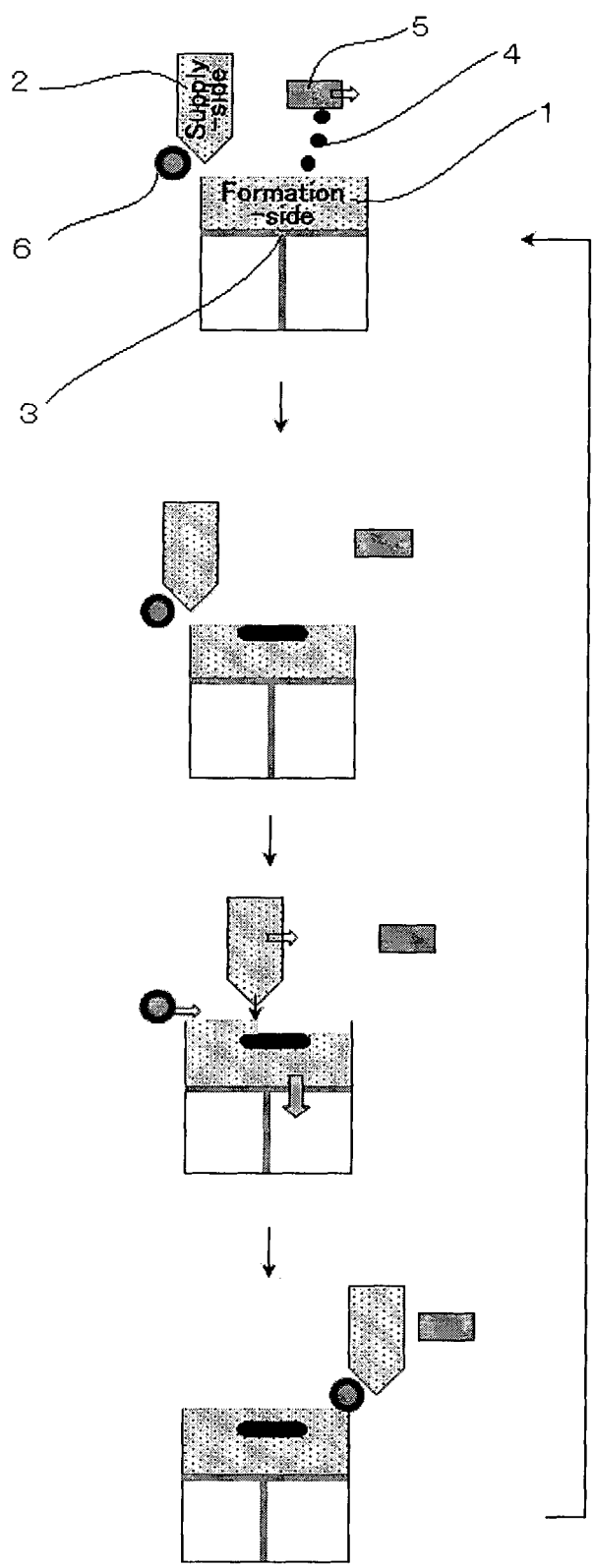
FIG. 2 is a schematic diagram showing another example of a powder stack formation apparatus of the present invention.

FIG. 2 shows another example of a powder stack formation apparatus of the present invention. The powder stack formation apparatus of FIG. 2 is identical with that of FIG. 1 in principle, but is different in the mechanism for supplying the powder material for three-dimensional object formation. Specifically, the supply-side powder storage tank 2 is provided above the formation-side powder storage tank 1. When image drawing over one layer is completed, the stage 3 of the formation-side powder storage tank 1 is lifted down by a predetermined amount, and the supply-side powder storage tank 2 moves while dropping a predetermined amount of the powder material for three-dimensional object formation onto the formation-side powder storage tank 1, to thereby form a new layer of the powder material for three-dimensional object formation. After this, the leveling machine 6 compresses the powder material for three-dimensional object formation to a higher bulk density, and levels off the powder material for three-dimensional object formation to a uniform height at the same time.

The powder stack formation apparatus shown in FIG. 2 can be made smaller in size than the configuration of FIG. 1 in which two powder storage tanks are arranged side by side horizontally.

By means of the formation method and the formation apparatus of a three-dimensional object of the present invention, it is possible to form a three-dimensional object having a complex stereoscopic (three-dimensional (3D)) shape easily, efficiently, without causing a shape collapse before sintering, etc., and dimensionally precisely, using the powder material for three-dimensional object formation or the three-dimensional object formation kit of the present invention.

A three-dimensional object and a sintered compact thereof that are obtained in this way have a sufficient strength and excellent dimensional precision, and can reproduce minute asperity, a curved surface, etc. Therefore, they are excellent in aesthetic appearance and quality, and can be favorably used for various applications.

EXAMPLES

Examples of the present invention will be explained below. The present invention is not limited to these Examples by any means.
—Preparation of Powder Material for Three-Dimensional Object Formation 1—
—Preparation of Coating Liquid 1—
As shown in Table 1-1, unmodified partially saponified polyvinyl alcohol (PVA-205C manufactured by Kuraray Co., Ltd., with an average degree of polymerization of 500, and a saponification degree of 88.0 mol %) (6 parts by mass), which was a water-soluble resin as the organic material ("No. 1" in Table 1-1) was mixed with water (114 parts by mass). While being heated to 80° C. in a water bus, they were stirred with a three-one motor (BL600 manufactured by Shinto Scientific Co., Ltd.) for 1 hour, to dissolve the polyvinyl alcohol in the water, to thereby prepare a 5% by mass polyvinyl alcohol aqueous solution (120 parts by mass). The preparation liquid obtained in this way was a coating liquid 1.

The viscosity of the 4% by mass (w/w %) polyvinyl alcohol aqueous solution at 20° C. measured with a viscometer (a rotational viscometer DV-E VISCOMETER HADVE TYPE 115 manufactured by Brookfield Engineering Inc.) was from 5.0 mPa·s to 6.0 mPa·s as shown in Table 1-1.
—Coating of Coating Liquid 1 Over Base Material Surface—

Next, with a commercially available coating machine (MP-01 manufactured by Powrex Corp.), the coating liquid 1 was applied to a coating thickness (average thickness) shown in Table 1-1 to a powder of stainless steel (SUS 316L) (PSS316L manufactured by Sanyo Special Steel Co., Ltd., with a volume average particle diameter of 41 μm) (100 parts by mass) as the base material ("No. 1" in Table 1-1). In the middle of this coating, the coating thickness (average thickness) and the surface coverage (%) of the coating liquid 1 were sampled as needed, so that they may become the values shown in Table 1-1 through appropriate adjustment of the coating time and interval. Through this, a powder material for three-dimensional object formation 1 was obtained. The method for measuring the coating thickness and surface coverage, and conditions of the coating were as described below.

<Coating Thickness (Average Thickness)>
For the coating thickness (average thickness), the surface of the powder material for three-dimensional object formation 1 was polished with emery paper, and then softly polished with cloth impregnated with water to dissolve the water-soluble resin portion, to thereby produce a sample for observation. Next, with a field-emission scanning electron microscope (FE-SEM), the boundary between the base material portion and the water-soluble resin portion that was exposed was observed, and the boundary portion was measured as the coating thickness. An average of 10 measurement positions was calculated as the coating thickness (average thickness).

<Surface Coverage>
With a field-emission scanning electron microscope (FE-SEM), a backscattered electron image (ESB) was captured under the following conditions at a viewing field setting at which about 10 particles of the powder material for three-dimensional object formation 1 would fall within the range of the image. The captured image was binarized through image processing with IMAGEJ software. A ratio between coated portions, which were black portions, and base material portions, which were white portions, in one particle was calculated according to "area of black portions/(area of black portions+area of white portions)×100". A hundred particles were measured, and their average was calculated as the surface coverage (%).
—SEM Observation Conditions—
  Signal: ESB (backscattered electron image)
  EHT: 0.80 kV
  ESB grid: 700 V
  WD: 3.0 mm
  Aperture size: 30.00 μm
  Contrast: 80%
  Magnification: set sample by sample such that about 10 particles would fall horizontally in the screen.
<Coating Conditions>
  Spray settings
  Nozzle type: 970
  Nozzle caliber: 1.2 mm
  Coating liquid discharging pressure: 4.7 Pa·s
  Coating liquid discharging rate: 3 g/min
  Amount of air atomized: 50 NL/min
  Rotor settings
  Rotor type: M-1
  Rotation speed: 60 rpm
  Rotation number: 400%
  Flow current settings
  Current feeding temperature: 80° C.
  Current feeding rate: 0.8 m$^3$/min
  Bag cleaning pressure of a bag filter: 0.2 MPa
  Bag cleaning time of a bag filter: 0.3 seconds
  Bag filter interval: 5 seconds
  Coating time: 40 minutes The average particle diameter of the obtained powder material for three-dimensional object formation 1 measured with a commercially available particle size meter (MICROTRACK HRA manufactured by Nikkiso Co, Ltd.) was 43 μm as shown in Table 2. The angle of repose of the obtained powder material, as the fluidity thereof, measured with a commercially available repose angle meter (POWDER TESTER TYPE PT-N manufactured by Hosokawa Micron Inc.) was 35 degrees as shown in Table 2. Note that there is a tendency that the fluidity is poorer as the measured value of the angle of repose is greater.
—Preparation of Hardening Liquid 1—

Water (70 parts by mass), 3-methyl 1,3-butanediol (manufactured by Tokyo Chemical Industry Co., Ltd.) (30 parts by mass) as a fluidity adjuster, and zirconium oxychloride octahydrate (zirconium oxychloride manufactured by Daiichi Kigenso Kagaku Kogyo Co., Ltd.) (0.1 parts by mass) as the cross-linking agent were dispersed with a homomixer for 30 minutes, to thereby prepare a hardening liquid 1 ("No. 1" in Table 1-1).

Example 1

A three-dimensional object 1 was formed in the following manner, with the obtained powder material for three-dimensional object formation 1 and the hardening liquid 1, and according to a shape printing pattern having a size of 70 mm in length and 12 mm in width.

1) First, with a publicly-known powder stack formation apparatus as shown in FIG. 1, the powder material for three-dimensional object formation 1 was moved from the supply-side powder storage tank to the formation-side powder storage tank, and a thin layer of the powder material for three-dimensional object formation 1 having an average thickness of 100 μm was formed over the support member.

2) Next, the hardening liquid 1 was delivered (discharged) onto the surface of the formed thin layer of the powder material for three-dimensional object formation 1 from a nozzle of a publicly-known inkjet discharge head, to dissolve the polyvinyl alcohol in water contained in the hardening liquid 1 and cross-link the polyvinyl alcohol by the effect of the cross-linking agent (zirconium oxychloride octahydrate) contained in the hardening liquid 1.

3) Next, hardened thin layers of the powder material for three-dimensional object formation 1 were sequentially stacked by repeating the operations of 1) and 2) described above until a predetermined total average thickness of 3 mm was obtained, and then subjected to a drying step with a drier by maintaining the layers at 50° C. for 4 hours and then 100° C. for 10 hours, to thereby form a three-dimensional object 1.

The dried three-dimensional object 1 was air-blown in order for excess powder material for three-dimensional object formation 1 to be removed. As a result, the three-dimensional object 1 did not have a shape collapse, and had an excellent strength and dimensional precision.

The strength (hardness) and the dimensional precision were evaluated based on the following criteria. The results are shown in Table 2.

<Strength (Hardness)>

D—The powder material for three-dimensional object formation was not hardened sufficiently, and the three-dimensional object could not be taken out from the stacked powder material layers, and could not maintain the predetermined shape when taken out.

C—The three-dimensional object could be taken out from the stacked powder material layers, and it was possible to remove excess powder material for three-dimensional object formation by adjusting an air blow pressure or using a brush while maintaining the shape of the three-dimensional object.

B—When the three-dimensional object was air-blown strongly, only excess powder material for three-dimensional object formation was removed, and the three-dimensional object itself maintained shape.

A—The three-dimensional object was hardened sufficiently, and could not be broken easily.

<Dimensional Precision>

D—The three-dimensional object had distortion on the surface, and when the surface was observed, uneven distribution of the base material and the organic material was confirmed.

C—The three-dimensional object had slight distortion and asperity on the surface.

B—The three-dimensional object had a favorable surface condition, but had slight warpage.

A—The three-dimensional object had a smooth and beautiful surface, and had no warpage.

4) The three-dimensional object 1 obtained in 3) described above was subjected to a wax removing step with a drier by raising the temperature up to 500° C. in 3 hours and 58 minutes, then maintaining the temperature at 400° C. for 4 hours, and then raising the temperature to 30° C. in 4 hours under a nitrogen atmosphere. Then, the three-dimensional object 1 was sintered in a sintering furnace, under vacuum conditions, at 1,400° C. As a result, a three-dimensional object 1 (a sintered compact) having a beautiful surface was obtained. This three-dimensional object 1 was a completely integrated stainless structure (metal lump), and not at all broken when slammed to a hard floor.

Example 2

A three-dimensional object 2 was formed in the same manner as in Example 1, except that unlike in Example 1, the coating time was adjusted to 2 minutes to thereby produce a powder material for three-dimensional object formation 2 having the average thickness and surface coverage shown in Table 1-1. The same evaluations as in Example 1 were performed. The results are shown in Table 2.

Example 3

A three-dimensional object 3 was formed in the same manner as in Example 1, except that unlike in Example 1, the coating time was adjusted to 200 minutes to thereby produce a powder material for three-dimensional object formation 3 having the average thickness and surface coverage shown in Table 1-1. The same evaluations as in Example 1 were performed. The results are shown in Table 2.

Example 4

A three-dimensional object 4 was formed in the same manner as in Example 2, except that unlike in Example 2, a hardening liquid 2 was prepared by using zirconium oxychloride octahydrate (zirconium oxychloride manufactured by Daiichi Kigenso Kagaku Kogyo Co., Ltd.) (3.0 parts by mass) as a cross-linking agent. The same evaluations as in Example 1 were performed. The results are shown in Table 2.

Example 5

A three-dimensional object 5 was formed in the same manner as in Example 2, except that unlike in Example 2, a hardening liquid 3 was prepared by using zirconium oxychloride octahydrate (zirconium oxychloride manufactured by Daiichi Kigenso Kagaku Kogyo Co., Ltd) (3.5 parts by mass) as a cross-linking agent. The same evaluations as in Example 1 were performed. The results are shown in Table 2.

Example 6

A three-dimensional object 6 was formed in the same manner as in Example 2, except that unlike in Example 2, the water-soluble resin was changed to a polyvinyl alcohol (PVA-220C manufactured by Kuraray Co., Ltd.). The same evaluations as in Example 1 were performed. The results are shown in Table 2.

Example 7

A three-dimensional object 7 was formed in the same manner as in Example 2, except that unlike in Example 2, the water-soluble resin was changed to a polyacrylic acid (JULIMER AC-10P manufactured by Toagosei Co., Ltd.), the cross-linking agent was changed to aluminum hydroxide (manufactured by Wako Pure Chemical Industries, Ltd.), respectively. The same evaluations as in Example 1 were performed. The results are shown in Table 2.

Example 8

A three-dimensional object 8 was formed in the same manner as in Example 7, except that unlike in Example 7, the water-soluble resin was changed to sodium polyacrylate (JULIMER AC-103P manufactured by Toagosei Co., Ltd.). The same evaluations as in Example 1 were performed. The results are shown in Table 2.

Example 9

A three-dimensional object 9 was formed in the same manner as in Example 8, except that unlike in Example 8, the cross-linking agent was changed to magnesium hydroxide (manufactured by Wako Pure Chemical Industries, Ltd.). The same evaluations as in Example 1 were performed. The results are shown in Table 2.

Example 10

A three-dimensional object 10 was formed in the same manner as in Example 1, except that unlike in Example 1, the water-soluble resin was changed to an acetoacetyl group-modified polyvinyl alcohol (GOHSENX Z-300 manufactured by Nippon Synthetic Chemical Industry Co., Ltd.), and the cross-linking agent was changed to a titanium lactate ammonium salt (ORGATIX TC-300 manufactured by Matsumoto Fine Chemical Co., Ltd.), respectively. The same evaluations as in Example 1 were performed. The results are shown in Table 2.

Example 11

A three-dimensional object 11 was formed in the same manner as in Example 10, except that unlike in Example 10, the water-soluble resin was changed to a carboxyl group-modified polyvinyl alcohol (GOHSENX T-330 manufactured by Nippon Synthetic Chemical Industry Co., Ltd.). The same evaluations as in Example 1 were performed. The results are shown in Table 2.

Example 12

A three-dimensional object 12 was formed in the same manner as in Example 10, except that unlike in Example 10, the water-soluble resin was changed to a butanediol vinyl alcohol copolymer (NICHIGO G-POLYMER OKS-8041 manufactured by Nippon Synthetic Chemical Industry Co., Ltd.). The same evaluations as in Example 1 were performed. The results are shown in Table 2.

Example 13

A three-dimensional object 13 was formed in the same manner as in Example 1, except that unlike in Example 1, the water-soluble resin was changed to carboxymethyl cellulose sodium (CELLOGEN 5A manufactured by Daiichi Kogyo Seiyaku Co., Ltd.), and the cross-linking agent was changed to basic aluminum acetate (manufactured by Wako Pure Chemical Industries, Ltd.), respectively. The same evaluations as in Example 1 were performed. The results are shown in Table 2.

Example 14

A three-dimensional object 14 was formed in the same manner as in example 13, except that unlike in Example 13, the water-soluble resin was changed to carboxymethyl cellulose sodium (CELLOGEN 6A manufactured by Daiichi Kogyo Seiyaku Co., Ltd.). The same evaluations as in example 1 were performed. The results are shown in Table 2.

Example 15

A three-dimensional object 15 was formed in the same manner as in Example 1, except that unlike in Example 1, the water-soluble resin was changed to starch (HISTARD PSS-5 manufactured by Sanwa Starch Co., Ltd.), and the cross-linking agent was changed to a bis vinyl sulfone compound (VS-B (K-FJC) manufactured by Fuji Fine Chemical Co., Ltd.), respectively. The same evaluations as in example 1 were performed. The results are shown in Table 2.

Example 16

A three-dimensional object 16 was formed in the same manner as in Example 15, except that unlike in Example 15, the water-soluble resin was changed to gelatin (BEMATRIX GELATIN manufactured by Nitta Gelatin Inc.). The same evaluations as in Example 1 were performed. The results are shown in Table 2.

Example 17

A three-dimensional object 17 was formed in the same manner as in Example 1, except that unlike in Example 1, the base material was changed to stainless steel (SUS 316L) (PSS316L (a product with a volume average particle diameter of 20 μm or less), manufactured by Sanyo Special Steel Co., Ltd.). The same evaluations as in Example 1 were performed. The results are shown in Table 2.

Example 18

A three-dimensional object 18 was formed in the same manner as in Example 1, except that unlike in Example 1, the base material was changed to silica (ECCERICA SE-15 manufactured by Tokuyama Corporation, with a volume average particle diameter of 24 μm). The same evaluations as in Example 1 were performed. The results are shown in Table 2.

Example 19

A three-dimensional object 19 was formed in the same manner as in Example 1, except that unlike in Example 1, the base material was changed to alumina (TAIMICRON TM-5D manufactured by Taimei Chemicals Co., Ltd., with a volume average particle diameter of 0.3 μm). The same evaluations as in Example 1 were performed. The results are shown in Table 2.

Example 20

A three-dimensional object 20 was formed in the same manner as in Example 1, except that unlike in Example 1, the base material was changed to zirconia (TZ-B53 manufactured by Tosoh Corporation, with a volume average particle diameter of 50 μm). The same evaluations as in Example 1 were performed. The results are shown in Table 2.

Example 21

Unlike in Example 1, a powder material for three-dimensional object formation was produced by changing the base material to stainless steel (SUS 316L) (PSS316L (a product with a volume average particle diameter of 20 μm or less), manufactured by Sanyo Special Steel Co., Ltd.). After this, the produced powder material for three-dimensional object formation was classified with a sonic sieve shaker SW-20A (manufactured by Tsutsui Scientific Instruments, Co., Ltd.), and particles having passed through a sieve aperture size of 5 μm were collected. The collected particles were used as a powder material for three-dimensional object formation 18.

A three-dimensional object 21 was formed in the same manner as in Example 1 with the use of the obtained powder material for three-dimensional object formation 18, and the same evaluations as in Example 1 were performed. The results are shown in Table 2.

Example 22

Unlike in Example 1, a powder material for three-dimensional object formation was produced by changing the base material to stainless steel (SUS 316L) (PSS316L (a product with a volume average particle diameter of 20 μm or less), manufactured by Sanyo Special Steel Co., Ltd.). After this, the produced powder material for three-dimensional object formation was classified with a sonic sieve shaker SW-20A (manufactured by Tsutsui Scientific Instruments, Co., Ltd.), and particles having passed through a sieve aperture size of 10 μm were collected. The collected particles were used as a powder material for three-dimensional object formation 19.

A three-dimensional object 22 was formed in the same manner as in Example 1 with the use of the obtained powder material for three-dimensional object formation 19, and the same evaluations as in Example 1 were performed. The results are shown in Table 2.

Example 23

A powder material for three-dimensional object formation 20 was produced in the same manner as in Example 1, except that unlike in Example 1, the base material was changed to stainless steel (SUS 316L) (PSS 316L (a product with a volume average particle diameter of 10 μm or less), manufactured by Sanyo Special Steel Co., Ltd.).

A three-dimensional object 23 was formed in the same manner as in Example 1 with the use of the obtained powder material for three-dimensional object formation 20, and the same evaluations as in Example 1 were performed. The results are shown in Table 2.

Comparative Example 1

A three-dimensional object 24 was formed in the same manner as in Example 1, except that unlike in Example 1, no cross-linking agent was used. The same evaluations as in Example 1 were performed. The results are shown in Table 2.

TABLE 1-1

| | Powder material for three-dimensional object formation | | | | | | | Hardening liquid | |
|---|---|---|---|---|---|---|---|---|---|
| | | Base material | | Organic material | | Ave. | | | Crosslinking |
| | | | | | | Viscosity | thickness | Surface | |
| | No. | No. | Kind | No. | Kind | (mPa · s) | (nm) | coverage | No. | agent |
| Ex. 1 | 1 | 1 | SUS 316L | 1 | Polyvinyl alcohol | 5.0-6.0 | 100 | 100% | 1 | zirconium oxy-chloride octa-hydrate |
| Ex. 2 | 2 | 1 | SUS 316L | 1 | Polyvinyl alcohol | 5.0-6.0 | 5 | 15% | 1 | zirconium oxy-chloride octa-hydrate |
| Ex. 3 | 3 | 1 | SUS 316L | 1 | Polyvinyl alcohol | 5.0-6.0 | 500 | 100% | 1 | zirconium oxy-chloride octa-hydrate |
| Ex. 4 | 2 | 1 | SUS 316L | 1 | Polyvinyl alcohol | 5.0-6.0 | 5 | 15% | 2 | zirconium oxy-chloride octa-hydrate |
| Ex. 5 | 2 | 1 | SUS 316L | 1 | Polyvinyl alcohol | 5.0-6.0 | 5 | 15% | 3 | zirconium oxy-chloride octa-hydrate |
| Ex. 6 | 4 | 1 | SUS 316L | 2 | Polyvinyl alcohol | 29.0-35.0 | 5 | 15% | 1 | zirconium oxy-chloride octa-hydrate |

TABLE 1-1-continued

| | Powder material for three-dimensional object formation | | | | | | | Hardening liquid | |
|---|---|---|---|---|---|---|---|---|---|
| | Base material | | | Organic material | | Ave. | | | Crosslinking |
| | | | | | Viscosity | thickness | Surface | | |
| | No. | No. | Kind | No. | Kind | (mPa · s) | (nm) | coverage | No. | agent |
| Ex. 7 | 5 | 1 | SUS 316L | 3 | Polyacrylic acid | 1.0-3.0 | 100 | 100% | 4 | Aluminum hydroxide |
| Ex. 8 | 6 | 1 | SUS 316L | 4 | Sodium polyacrylate | 3.0-5.0 | 100 | 100% | 4 | Aluminum hydroxide |
| Ex. 9 | 6 | 1 | SUS 316L | 4 | Sodium polyacrylate | 3.0-5.0 | 100 | 100% | 5 | Magnesium hydroxide |

TABLE 1-2

| | Powder material for three-dimensional object formation | | | | | | | Hardening liquid | |
|---|---|---|---|---|---|---|---|---|---|
| | Base material | | | Organic material | | Ave. | | | Crosslinking |
| | | | | | Viscosity | thickness | Surface | | |
| | No. | No. | Kind | No. | Kind | (mPa · s) | (nm) | coverage | No. | agent |
| Ex. 10 | 7 | 1 | SUS 316L | 5 | Aceto acetyl group-modified polyvinyl alcohol | 24.0-30.0 | 100 | 100% | 6 | Titanium lactate ammonium salt |
| Ex. 11 | 8 | 1 | SUS 316L | 6 | Carboxyl group-modified polyvinyl alcohol | 27.0-33.0 | 100 | 100% | 6 | Titanium lactate ammonium salt |
| Ex. 12 | 9 | 1 | SUS 316L | 7 | Butane diol vinyl alcohol copolymer | 3.0 | 100 | 100% | 6 | Titanium lactate ammonium salt |
| Ex. 13 | 10 | 1 | SUS 316L | 8 | Carboxy methyl cellulose sodium | 10.0-15.0 | 100 | 100% | 7 | Basic aluminum acetate |
| Ex. 14 | 11 | 1 | SUS 316L | 9 | Carboxy methyl cellulose sodium | 35.0-40.0 | 100 | 100% | 7 | Basic aluminum acetate |
| Ex. 15 | 12 | 1 | SUS 316L | 10 | Starch | 6.0 | 100 | 100% | 8 | Bis vinyl sulfone compound |
| Ex. 16 | 13 | 1 | SUS 316L | 11 | Gelatin | 10.0 | 100 | 100% | 8 | Bis vinyl sulfone compound |
| Ex. 17 | 14 | 2 | SUS 316L | 1 | Polyvinyl alcohol | 5.0-6.0 | 100 | 100% | 1 | zirconium oxychloride octahydrate |
| Ex. 18 | 15 | 3 | SiO$_2$ | 1 | Polyvinyl alcohol | 5.0-6.0 | 100 | 100% | 1 | zirconium oxychloride octahydrate |

TABLE 1-3

| | | Powder material for three-dimensional object formation | | | | | | Hardening liquid | |
|---|---|---|---|---|---|---|---|---|---|
| | | Base material | | | Organic material | | Ave. thickness (nm) | Surface coverage | | Crosslinking |
| | No. | No. | Kind | No. | Kind | Viscosity (mPa·s) | | | No. | agent |
| Ex. 19 | 16 | 4 | Al₂O₃ | 1 | Polyvinyl alcohol | 5.0-6.0 | 100 | 100% | 1 | zirconium oxychloride octahydrate |
| Ex. 20 | 17 | 5 | ZrO₂ | 1 | Polyvinyl alcohol | 5.0-6.0 | 100 | 100% | 1 | zirconium oxychloride octahydrate |
| Ex. 21 | 18 | 6 | SUS 316L | 1 | Polyvinyl alcohol | 5.0-6.0 | 100 | 100% | 1 | zirconium oxychloride octahydrate |
| Ex. 22 | 19 | 7 | SUS 316L | 1 | Polyvinyl alcohol | 5.0-6.0 | 100 | 100% | 1 | zirconium oxychloride octahydrate |
| Ex. 23 | 20 | 8 | SUS 316L | 1 | Polyvinyl alcohol | 5.0-6.0 | 100 | 100% | 1 | zirconium oxychloride octahydrate |
| Comp. Ex. 1 | 1 | 1 | SUS 316L | 1 | Polyvinyl alcohol | 5.0-6.0 | 100 | 100% | none | — |

TABLE 2

| | Powder material for three-dimensional object formation | fluidity | Three-dimensional object evaluations | |
|---|---|---|---|---|
| | No. | Ave. particle diameter (μm) | Angle of repose (deg) | Strength | Dimensional precision |
| Ex. 1 | 1 | 43 | 35 | B | B |
| Ex. 2 | 2 | 43 | 32 | C | A |
| Ex. 3 | 3 | 88 | 42 | A | C |
| Ex. 4 | 2 | 43 | 32 | A | B |
| Ex. 5 | 2 | 43 | 32 | A | B |
| Ex. 6 | 4 | 125 | 37 | A | B |
| Ex. 7 | 5 | 43 | 33 | B | B |
| Ex. 8 | 6 | 43 | 36 | B | B |
| Ex. 9 | 6 | 43 | 36 | C | B |
| Ex. 10 | 7 | 116 | 39 | A | B |
| Ex. 11 | 8 | 155 | 40 | A | B |
| Ex. 12 | 9 | 43 | 31 | A | B |
| Ex. 13 | 10 | 85 | 30 | B | B |
| Ex. 14 | 11 | 220 | 41 | B | C |
| Ex. 15 | 12 | 43 | 33 | C | B |
| Ex. 16 | 13 | 43 | 33 | C | B |
| Ex. 17 | 14 | 15 | 45 | B | A |
| Ex. 18 | 15 | 15 | 36 | B | A |
| Ex. 19 | 16 | 250 | 42 | B | C |
| Ex. 20 | 17 | 48 | 33 | B | B |
| Ex. 21 | 18 | 3 | 46 | A | C |
| Ex. 22 | 19 | 5 | 45 | A | B |
| Ex. 23 | 20 | 10 | 45 | A | B |
| Comp. Ex. 1 | 1 | 43 | 35 | D | A |

—Preparation of Power Material for Three-Dimensional Object Formation 101—
—Preparation of Coating Liquid 101—

As shown in Table 3-1, an acetoacetyl group-modified polyvinyl alcohol (GOHSENX Z-100 manufactured by Nippon Synthetic Chemical Industry Co., Ltd., with an average degree of polymerization of 500, and a saponification degree of 98.5 mol %) (6 parts by mass), which was a water-soluble resin, was mixed with water (114 parts by mass). While being heated to 90° C. in a water bus, they were stirred with a three-one motor (BL600 manufactured by Shinto Scientific Co., Ltd.) for 1 hour, to dissolve the acetoacetyl group-modified polyvinyl alcohol in the water, to thereby prepare a 5% by mass acetoacetyl group-modified polyvinyl alcohol aqueous solution (120 parts by mass). The preparation liquid obtained in this way was a coating liquid 101.

The viscosity of the 4% by mass (w/w %) acetoacetyl group-modified polyvinyl alcohol aqueous solution at 20° C., measured with a viscometer (a rotational viscometer DV-E VISCOMETER HADVE TYPE 115 manufactured by Brookfield Engineering Inc.), was from 5.0 mPa·s to 6.0 mPa·s, as shown in Table 3-1.

—Coating of Coating Liquid 101 Over Base Material Surface—

Next, with a commercially available coating machine (MP-01 manufactured by Powrex Corp.), the coating liquid 101 was applied to a coating thickness (average thickness) shown in Table 3-1 to a powder of stainless steel (SUS 316L) (PSS316L manufactured by Sanyo Special Steel Co., Ltd., with a volume average particle diameter of 41 μm) (100 parts by mass) as the base material ("No. 101" in Table 3-1). In the middle of this coating, the coating thickness (average thickness) and the surface coverage (%) of the coating liquid 101 were sampled as needed, so that they may become the values shown in Table 3-1 through appropriate adjustment of the coating time and interval. Through this, a powder material for three-dimensional object formation 101 was obtained. The method for measuring the coating thickness and surface coverage was the same as that for the powder material 1 for three-dimensional object formation, and conditions of the coating were as described below.

<Coating Conditions>
Spray settings
Nozzle type: 970
Nozzle caliber: 1.2 mm
Coating liquid discharging pressure: 4.7 Pa·s
Coating liquid discharging rate: 3 g/min
Amount of air atomized: 50 NL/min
Rotor settings
Rotor type: M-1
Rotation speed: 60 rpm
Rotation number: 400%
Flow current settings
Current feeding temperature: 80° C.
Current feeding rate: 0.8 m$^3$/min
Bag cleaning pressure of a bag filter: 0.2 MPa
Bag cleaning time of a bag filter: 0.3 seconds
Bag filter interval: 5 seconds
Coating time: 160 minutes
—Preparation of Hardening Liquid 101—
Water (70 parts by mass), 3-methyl 1,3-butanediol (manufactured by Tokyo Chemical Industry Co., Ltd.) (30 parts by mass) as a fluidity adjuster, and an ammonium zirconium carbonate salt (ZIRCOZOL AC-20 manufactured by Daiichi Kigenso Kagaku Kogyo Co., Ltd.) (5 parts by mass) as the cross-linking agent were mixed and dissolved, to thereby prepare a hardening liquid 101.

Example 24

A three-dimensional object 101 was formed in the following manner, with the obtained powder material for three-dimensional object formation 101, the hardening liquid 101, and a shape printing pattern having a size of 70 mm in length and 12 mm in width.

1) First, with a publicly-known powder stack formation apparatus as shown in FIG. 1, the powder material for three-dimensional object formation 101 was moved from the supply-side powder storage tank to the formation-side powder storage tank, and a thin layer of the powder material for three-dimensional object formation 101 having an average thickness of 100 μm was formed over the support member.

2) Next, the hardening liquid 101 was delivered (discharged) onto the surface of the formed thin layer of the powder material for three-dimensional object formation 101 from a nozzle of a publicly-known inkjet discharge head, to dissolve the acetoacetyl group-modified polyvinyl alcohol in water contained in the hardening liquid 101 and cross-link the acetoacetyl group-modified polyvinyl alcohol by the effect of the cross-linking agent (ammonium zirconium carbonate salt) contained in the hardening liquid 101.

3) Next, hardened thin layers of the powder material for three-dimensional object formation 101 were sequentially stacked by repeating the operations of 1) and 2) described above until a predetermined total average thickness of 3 mm was obtained, and then subjected to a drying step with a drier by maintaining the layers at 50° C. for 4 hours and then 100° C. for 10 hours, to thereby form a three-dimensional object 101.

The dried three-dimensional object 101 was air-blown in order for excess powder material for three-dimensional object formation 101 to be removed. As a result, the three-dimensional object 101 did not have a shape collapse, and had an excellent strength and dimensional precision.

The strength (hardness) and the dimensional precision of the obtained three-dimensional object 101 were evaluated in the same manner as in Example 1 described above. Further, a bending stress of the three-dimensional object 101 was measured in the manner described below. The results are shown in Table 4.

<Bending Stress>
A three-point bending stress (MPa) of the obtained three-dimensional object 101 was measured with an autograph AGS-J and a three-point bending test jig (plastic) manufactured by Shimadzu Corporation. The bending stress was evaluated based on the criteria below.

[Evaluation Criteria]
A: 8.0 MPa or greater
B: 5.0 MPa or greater but less than 8.0 MPa
C: 3.0 MPa or greater but less than 5.0 MPa
D: Less than 3.0 MPa 4) The three-dimensional object 101 obtained in 3) described above was subjected to a wax removing step with a drier by raising the temperature up to 500° C. in 3 hours and 58 minutes, then maintaining the temperature at 400° C. for 4 hours, and then raising the temperature to 30° C. in 4 hours under a nitrogen atmosphere. Then, the three-dimensional object 101 was sintered in a sintering furnace, under vacuum conditions, at 1,400° C. As a result, a three-dimensional object 101 (a sintered compact) having a beautiful surface was obtained. This three-dimensional object 101 was a completely integrated stainless structure (metal lump), and not at all broken when slammed to a hard floor.

Example 25

A three-dimensional object 102 was formed in the same manner as in Example 24, except that unlike in Example 24, the coating time was adjusted to 80 minutes to thereby produce a powder material for three-dimensional object formation 102 having the average thickness and surface coverage shown in Table 3-1. The same evaluations as in Example 24 were performed. The results are shown in Table 4.

Example 26

A three-dimensional object 103 was formed in the same manner as in Example 24, except that unlike in Example 24, the coating time was adjusted to 320 minutes to thereby produce a powder material for three-dimensional object formation 103 having the average thickness and surface coverage shown in Table 3-1. The same evaluations as in Example 24 were performed. The results are shown in Table 4.

Example 27

A three-dimensional object 104 was formed in the same manner as in Example 24, except that unlike in Example 24, a glyoxylic acid salt (SAFELINK SPM-01 manufactured by Nippon Synthetic Chemical Industry Co., Ltd.) (3.0 parts by mass) was used as a cross-linking agent to thereby prepare a hardening liquid 102. The same evaluations as in Example 24 were performed. The results are shown in Table 4.

Example 28

A three-dimensional object 105 was formed in the same manner as in Example 25 except that unlike in Example 25, adipic dihydrazide (manufactured by Otsuka Chemical Co., Ltd.) (3.5 parts by mass) was used as a cross-linking agent to thereby prepare a hardening liquid 103. The same evaluations as in Example 24 were performed. The results are shown in Table 4.

Example 29

A three-dimensional object 106 was formed in the same manner as in Example 25, except that unlike in Example 25, the water-soluble resin was changed to an acetoacetyl group-modified polyvinyl alcohol (GOHSENX Z-200 manufactured by Nippon Synthetic Chemical Industry Co., Ltd., with an average degree of polymerization of 1,000, and a saponification degree of 99.0 mol %), the coating liquid concentration was changed to 3% by mass, and the coating time was adjusted to 133 minutes. The same evaluations as in Example 24 were performed. The results are shown in Table 4.

Example 30

A three-dimensional object 107 was formed in the same manner as in Example 25, except that unlike in Example 25, the water-soluble resin was changed to an acetoacetyl group-modified polyvinyl alcohol (GOHSENX Z-210 manufactured by Nippon Synthetic Chemical Industry Co., Ltd., with an average degree of polymerization of 1,000, and a saponification degree of 95.5 mol %), the coating liquid concentration was changed to 3% by mass, and the coating time was adjusted to 133 minutes. The same evaluations as in Example 24 were performed. The results are shown in Table 4.

Example 31

A three-dimensional object 108 was formed in the same manner as in Example 25, except that unlike in Example 25, the water-soluble resin was changed to an acetoacetyl group-modified polyvinyl alcohol (GOHSENX Z-220 manufactured by Nippon Synthetic Chemical Industry Co., Ltd., with an average degree of polymerization of 1,000, and a saponification degree of 90.8 mol %), the coating liquid concentration was changed to 3% by mass, and the coating time was adjusted to 133 minutes. The same evaluations as in Example 24 were performed. The results are shown in Table 4.

Example 32

A three-dimensional object 109 was formed in the same manner as in Example 25, except that unlike in Example 25, the water-soluble resin was changed to an acetoacetyl group-modified polyvinyl alcohol (GOHSENX Z-300 manufactured by Nippon Synthetic Chemical Industry Co., Ltd., with an average degree of polymerization of 1,700, and a saponification degree of 99.0 mol %), the coating liquid concentration was changed to 3% by mass, and the coating time was adjusted to 133 minutes. The same evaluations as in Example 24 were performed. The results are shown in Table 4.

Example 33

A three-dimensional object 110 was formed in the same manner as in Example 24, except that unlike in Example 24, zirconium lactate ammonium salt (ORGATIX ZC-300 manufactured by Matsumoto Fine Chemical Co., Ltd.) (5 parts by mass) was used as the cross-linking agent to thereby prepare a hardening liquid 104. The same evaluations as in Example 24 were performed. The results are shown in Table 4.

Example 34

A three-dimensional object 111 was formed in the same manner as in Example 25, except that unlike in Example 25, zirconium lactate ammonium salt (ORGATIX ZC-300 manufactured by Matsumoto Fine Chemical Co., Ltd.) (5 parts by mass) was used as the cross-linking agent to thereby prepare a hardening liquid 104. The same evaluations as in Example 24 were performed. The results are shown in Table 4.

Example 35

A three-dimensional object 112 was formed in the same manner as in Example 26, except that unlike in Example 26, zirconium lactate ammonium salt (ORGATIX ZC-300 manufactured by Matsumoto Fine Chemical Co., Ltd.) (5 parts by mass) was used as the cross-linking agent to thereby prepare a hardening liquid 104. The same evaluations as in Example 24 were performed. The results are shown in Table 4.

Example 36

A three-dimensional object 113 was formed in the same manner as in Example 34, except that unlike in Example 34, the water-soluble resin was changed to a carboxyl group-modified polyvinyl alcohol (GOHSENX T-330 manufactured by Nippon Synthetic Chemical Industry Co., Ltd.), the coating liquid concentration was changed to 3% by mass, and the coating time was adjusted to 133 minutes. The same evaluations as in Example 24 were performed. The results are shown in Table 4.

Example 37

A three-dimensional object 114 was formed in the same manner as in Example 34, except that unlike in Example 34, the water-soluble resin was changed to a non-modified partially-saponified polyvinyl alcohol (PVA-205C manufactured by Kuraray Co., Ltd., with an average degree of polymerization of 500, and a saponification degree of 88.0 mol %). The same evaluations as in Example 24 were performed. The results are shown in Table 4.

Comparative Example 2

A three-dimensional object 115 was formed in the same manner as in Example 25, except that unlike in example 25, no cross-linking agent was used. The same evaluations as in Example 24 were performed. The results are shown in Table 4.

Comparative Example 3

A three-dimensional object 116 was formed in the same manner as in Example 25, except that the cross-linking agent was changed from the ammonium zirconium carbonate salt (ZIRCOZOL AC-20 manufactured by Daiichi Kigenso Kagaku Kogyo Co., Ltd.) of Example 25 to dialkyl peroxide (KAYABUTYL C manufactured by Kayaku Akzo Corporation) to thereby prepare a hardening liquid 105. The same evaluations as in Example 24 were performed. The results are shown in Table 4.

TABLE 3-1

| | Powder material for three-dimensional object formation | | | | | | | | Hardening liquid | |
|---|---|---|---|---|---|---|---|---|---|---|
| | | Base material | | Organic material | | Viscosity | Ave. thickness | Surface | | Crosslinking |
| | No. | No. | Kind | No. | Kind | (mPa·s) | (nm) | coverage | No. | agent |
| Ex. 24 | 101 | 101 | SUS 316L | 101 | Acetoacetyl group-modified polyvinyl alcohol | 5.0-6.0 | 400 | 100% | 101 | Ammonium zirconium carbonate salt |
| Ex. 25 | 102 | 101 | SUS 316L | 101 | Acetoacetyl group-modified polyvinyl alcohol | 5.0-6.0 | 200 | 100% | 101 | Ammonium zirconium carbonate salt |
| Ex. 26 | 103 | 101 | SUS 316L | 101 | Acetoacetyl group-modified polyvinyl alcohol | 5.0-6.0 | 800 | 100% | 101 | Ammonium zirconium carbonate salt |
| Ex. 27 | 101 | 101 | SUS 316L | 101 | Acetoacetyl group-modified polyvinyl alcohol | 5.0-6.0 | 400 | 100% | 102 | Glyoxylic acid salt |
| Ex. 28 | 102 | 101 | SUS 316L | 101 | Acetoacetyl group-modified polyvinyl alcohol | 5.0-6.0 | 200 | 100% | 103 | Adipic dihydrazide |
| Ex. 29 | 104 | 101 | SUS 316L | 102 | Acetoacetyl group-modified polyvinyl alcohol | 11.5-15.0 | 200 | 100% | 101 | Ammonium zirconium carbonate salt |
| Ex. 30 | 105 | 101 | SUS 316L | 103 | Acetoacetyl group-modified polyvinyl alcohol | 11.5-15.0 | 200 | 100% | 101 | Ammonium zirconium carbonate salt |
| Ex. 31 | 106 | 101 | SUS 316L | 104 | Acetoacetyl group-modified polyvinyl alcohol | 11.5-15.0 | 200 | 100% | 101 | Ammonium zirconium carbonate salt |

TABLE 3-2

| | Powder material for three-dimensional object formation | | | | | | | Hardening liquid | |
|---|---|---|---|---|---|---|---|---|---|
| | Base material | | Organic material | | | Ave. thickness (nm) | Surface coverage | Crosslinking | |
| | No. | Kind | No. | Kind | Viscosity (mPa·s) | | | No. | agent |
| Ex. 32 | 107 | 101 SUS 316L | 105 | Acetoacetyl group-modified polyvinyl alcohol | 24.0-30.0 | 200 | 100% | 101 | Ammonium zirconnium carbonate salt |
| Ex. 33 | 101 | 101 SUS 316L | 101 | Acetoacetyl group-modified polyvinyl alcohol | 5.0-6.0 | 400 | 100% | 104 | Zirconium lactate ammonium salt |
| Ex. 34 | 102 | 101 SUS 316L | 101 | Acetoacetyl group-modified polyvinyl alcohol | 5.0-6.0 | 200 | 100% | 104 | Zirconium lactate ammonium salt |
| Ex. 35 | 103 | 101 SUS 316L | 101 | Acetoacetyl group-modified polyvinyl alcohol | 5.0-6.0 | 800 | 100% | 104 | Zirconium lactate ammonium salt |
| Ex. 36 | 108 | 101 SUS 316L | 101 | Carboxyl group modified polyvinyl alcohol | 27.0-33.0 | 200 | 100% | 104 | Zirconium lactate ammonium salt |
| Ex. 37 | 109 | 101 SUS 316L | 101 | Partially-saponified polyvinyl alcohol | 5.0-6.0 | 200 | 100% | 104 | Zirconium lactate ammonium salt |
| Comp. Ex. 2 | 102 | 101 SUS 316L | 101 | Acetoacetyl group-modified polyvinyl alcohol | 5.0-6.0 | 200 | 100% | — | None |
| Comp. Ex. 3 | 102 | 101 SUS 316L | 101 | Acetoacetyl group-modified polyvinyl alcohol | 5.0-6.0 | 200 | 100% | 105 | Dialkyl peroxide |

TABLE 4

| | Powder material for three-dimensional object formation | | fluidity Angle of repose (deg) | Three-dimensional object evaluations | | |
|---|---|---|---|---|---|---|
| | No. | Ave. particle diameter (μm) | | Strength | Dimensional precision | Bending stress (Mpa) |
| Ex. 24 | 101 | 48 | 35 | A | A | A |
| Ex. 25 | 102 | 47 | 34 | A | A | B |
| Ex. 26 | 103 | 49 | 37 | A | B | A |
| Ex. 27 | 101 | 48 | 36 | A | B | C |
| Ex. 28 | 102 | 47 | 32 | A | B | C |
| Ex. 29 | 104 | 48 | 34 | A | B | B |
| Ex. 30 | 105 | 48 | 33 | A | B | B |
| Ex. 31 | 106 | 48 | 37 | A | B | B |
| Ex. 32 | 107 | 100 | 39 | A | B | C |
| Ex. 33 | 101 | 48 | 35 | A | A | B |
| Ex. 34 | 102 | 47 | 34 | A | A | C |
| Ex. 35 | 103 | 49 | 37 | A | B | A |
| Ex. 36 | 108 | 40 | 34 | A | B | C |
| Ex. 37 | 109 | 38 | 37 | B | B | C |
| Comp. Ex. 2 | 102 | 47 | 35 | D | D | D |
| Comp. Ex. 3 | 102 | 47 | 34 | D | D | D |

Examples 38 to 40

Discharging stability (storage stability test) of the hardening liquids 6, 101, and 104 described above was evaluated based on the criteria described below. The results are shown in Table 5.

<Storage Stability Test on Hardening Liquid>

A hundred droplets of each of the hardening liquids were discharged from 50 nozzles of an inkjet discharge head (with a nozzle diameter of 28μ), and after this, the ink discharge head was left under a 50° C. condition for 1 month with the nozzles capped. Storage stability of each hardening liquid was evaluated based on the number of times of cleaning operations required until the discharging condition of each hardening liquid after left under that condition was returned to the initial discharging condition.

[Evaluation Criteria]

D: The initial discharging condition was not recovered with 4 or more times of cleaning operations.

C: The initial discharging condition was recovered with 3 times of cleaning operations.

B: The initial discharging condition was recovered with 2 times of cleaning operations.

A: The initial discharging condition was recovered with 1 time of cleaning operation.

Comparative Example 4

Discharging stability (storage stability test) of the hardening liquid 105 described above was evaluated in the same manner as in Examples 38 to 40. The result is shown in Table 5.

TABLE 5

| | Hardening liquid | | |
|---|---|---|---|
| | No. | Cross-linking agent | Storage stability |
| Ex. 38 | 6 | Titanium lactate ammonium salt | A |
| Ex. 39 | 101 | Ammonium zirconium carbonate salt | C |
| Ex. 40 | 104 | Zirconium lactate ammonium salt | A |
| Comp. Ex. 4 | 105 | Dialkyl peroxide (KAYABUTYL C) | D |

Aspects of the present invention are as follows, for example.

<1> A three-dimensional object formation method, including forming a three-dimensional object by at least repeating:

forming a powder material layer using a powder material for three-dimensional object formation containing a base material coated with an organic material; and hardening a predetermined region of the powder material layer by delivering a hardening liquid to the powder material layer formed in the formation of a powder material layer, where the hardening liquid contains a cross-linking agent cross-linkable with the organic material.

<2> The three-dimensional object formation method according to <1>, wherein the cross-linking agent is any of a water-soluble organic cross-linking agent and a metal salt.

<3> The three-dimensional object formation method according to <2>, wherein the metal salt ionizes a divalent or higher cationic metal in water.

<4> The three-dimensional object formation method according to <3>, wherein a lactic acid ion is coordinated to the cationic metal.

<5> The three-dimensional object formation method according to any one of <1> to <4>, wherein a coverage of a surface of the base material with the organic material is 15% or higher.

<6> The three-dimensional object formation method according to any one of <1> to <5>, wherein a 4% by mass (w/w %) solution of the organic material has a viscosity of 40 mPa·S or lower at 20° C.

<7> The three-dimensional object formation method according to any one of <1> to <6>, wherein the organic material is a water-soluble resin.

<8> The three-dimensional object formation method according to <7>, wherein the water-soluble resin contains a polyvinyl alcohol resin.

<9> The three-dimensional object formation method according to <8>, wherein the polyvinyl alcohol resin is an acetoacetyl group-modified polyvinyl alcohol resin.

<10> The three-dimensional object formation method according to <8> or <9>, wherein the polyvinyl alcohol resin has an average degree of polymerization of from 400 to 1,100.

<11> The three-dimensional object formation method according to any one of <1> to <10>, wherein the powder material for three-dimensional object formation has an average particle diameter of from 3 μm to 250 μm.

<12> The three-dimensional object formation method according to any one of <1> to <11>, wherein the base material is metal particles, or ceramics particles, or both.

<13> The three-dimensional object formation method according to any one of <1> to <12>, further including:

sintering the three-dimensional object formed by repeating the formation of a powder material layer and the hardening.

<14> The three-dimensional object formation method according to any one of <1> to <13>, wherein the delivering of the hardening liquid is performed according to an inkjet method.

<15> A powder material for three-dimensional object formation, wherein the powder material for three-dimensional object formation is used in the three-dimensional object formation method according to any one of <1> to <14>, and contains the base material coated with the organic material.

<16> A hardening liquid, wherein the hardening liquid is used in the three-dimensional object formation method according to any one of <1> to <14>, and contains the cross-linking agent cross-linkable with the organic material.

<17> A three-dimensional object formation kit, including:

the powder material for three-dimensional object formation according to <15>; and the hardening liquid according to <16>.

<18> A three-dimensional object formation apparatus, including:

a powder material layer forming unit configured to form a layer of a powder material for three-dimensional object formation containing a base material coated with an organic material;

a hardening liquid delivering unit configured to deliver a hardening liquid containing a cross-linking agent cross-linkable with the organic material, in order to harden a predetermined region of the layer of the powder material for three-dimensional object formation formed by the powder material layer forming unit;

a powder material containing unit containing the powder material for three-dimensional object formation; and a hardening liquid containing unit containing the hardening liquid.

REFERENCE SIGNS LIST

1 formation-side powder storage tank
2 supply-side powder storage tank
3 stage
4 hardening liquid
5 inkjet head
6 leveling machine

The invention claimed is:

1. A three-dimensional object formation method, comprising:
   forming a powder material layer comprising a powder material for three-dimensional object formation, the powder material comprising a particle which comprises:
      a base material, which is a metal particle, a ceramic particle, or both; and
      an organic material provided on a surface of the base material, and having a thickness of from 5 to 300 nm, wherein the surface of the base material is covered with the organic material at a coverage of 50% by area or greater, and wherein the organic material is an organic resin;
   delivering a hardening liquid by discharging to the powder material layer formed in the formation of a powder material layer, where the hardening liquid comprises a cross-linking agent containing a site cross-linkable with a cross-linkable functional group of the organic material, wherein the organic material is dissolved and cross-linked by an effect of the cross-linking agent;
   hardening a predetermined region of the powder material layer, and
   repeating the forming of the powder material layer, the delivering of the hardening liquid and the hardening of the predetermined region of the powder material layer, to form a three-dimensional object.

2. The three-dimensional object formation method according to claim 1,
   wherein the cross-linking agent is at least one selected from the group consisting of a water-soluble organic cross-linking agent and a metal salt.

3. The three-dimensional object formation method according to claim 2,
   wherein the cross-linking agent is the metal salt, and the metal salt comprises a divalent or higher cationic metal which ionizes in water.

4. The three dimensional object formation method according to claim 3,
   wherein the metal salt comprises a lactic acid ion, which is coordinated to the cationic metal in water.

5. The three-dimensional object formation method according to claim 1,
   wherein a 4% by mass (w/w %) solution of the organic material in a solvent of the hardening liquid has a viscosity of 40 mPa·s or lower at 20° C.

6. The three-dimensional object formation method according to claim 1,
   wherein the organic material is a water-soluble resin.

7. The three-dimensional object formation method according to claim 6,
   wherein the water-soluble resin comprises a polyvinyl alcohol resin.

8. The three-dimensional object formation method according to claim 7,
   wherein the polyvinyl alcohol resin is an acetoacetyl group-modified polyvinyl alcohol resin.

9. The three-dimensional object formation method according to claim 7,
   wherein the polyvinyl alcohol resin has an average degree of polymerization of from 400 to 1,100.

10. The three-dimensional object formation method according to claim 1,
    wherein the powder material for three-dimensional object formation has an average particle diameter of from 3 μm to 250 μm.

11. The three-dimensional object formation method according to claim 1, further comprising:
    sintering the three-dimensional object formed by the repeating of the forming of the powder material layer, the delivering of the hardening liquid and the hardening of the predetermined region of the powder material layer.

12. The three-dimensional object formation method according to claim 1,
    wherein the delivering of the hardening liquid is performed with an inkjet method.

13. The three-dimensional object formation method according to claim 1,
    wherein an amount of the cross-linking agent is from 0.1 parts by mass to 5 parts by mass relative to 100 parts by mass of the hardening liquid.

14. The three-dimensional object formation method according to claim 1,
    wherein the organic material is at least one selected from the group consisting of an acrylic resin, a maleic acid resin, a butyral resin, an epoxy resin, and a polyvinyl butyral resin.

* * * * *